(No Model.) 4 Sheets—Sheet 1.
A. M. WELLINGTON, Dec'd.
A. B. WELLINGTON, Executrix.
THERMODYNAMIC PROCESS AND APPARATUS.
No. 549,983. Patented Nov. 19, 1895.
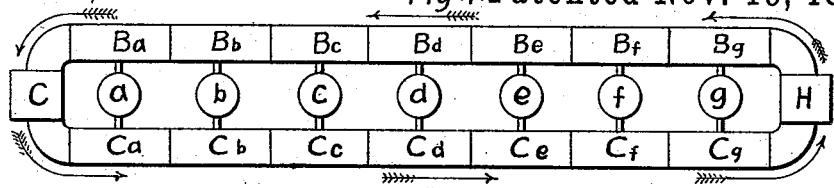
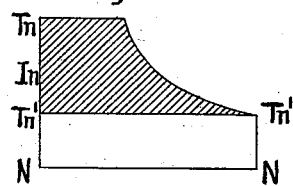
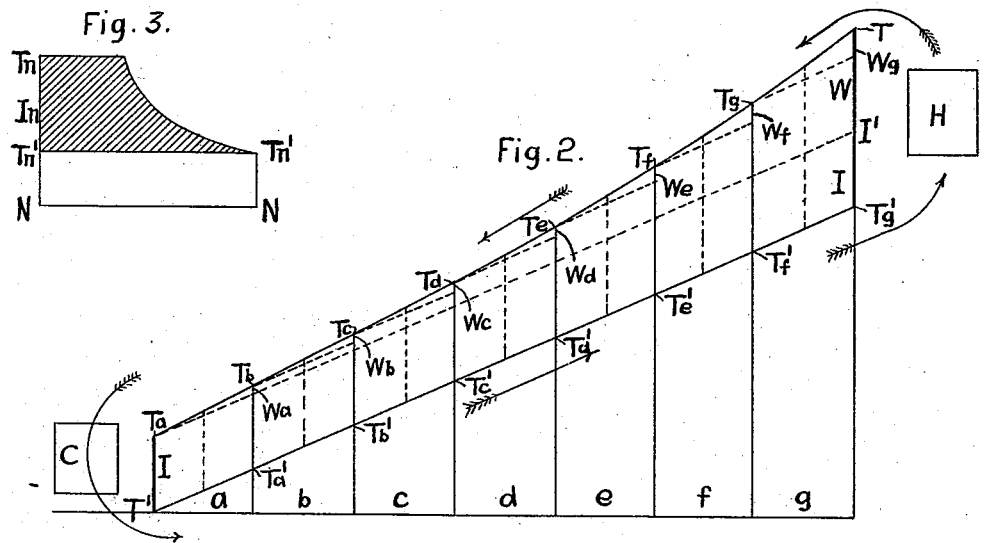
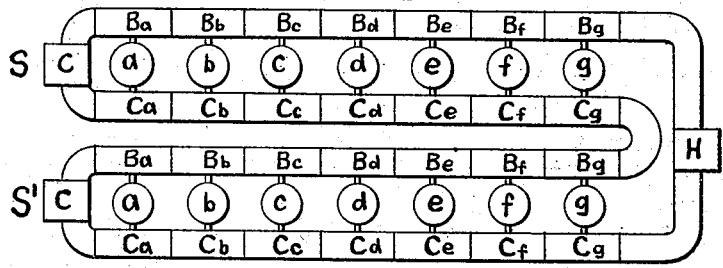
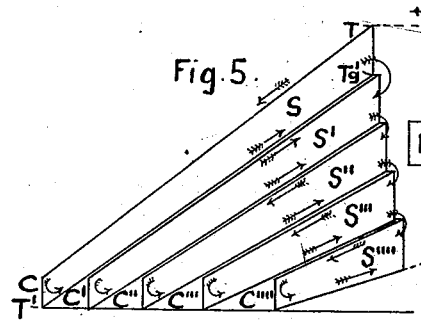
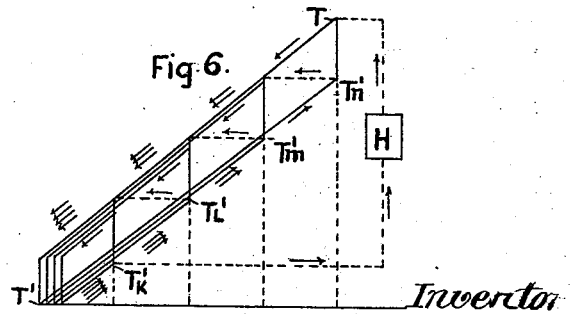

(No Model.) 4 Sheets—Sheet 2.
A. M. WELLINGTON, Dec'd.
A. B. WELLINGTON, Executrix.
THERMODYNAMIC PROCESS AND APPARATUS.
No. 549,983. Patented Nov. 19, 1895.
Fig. 7.
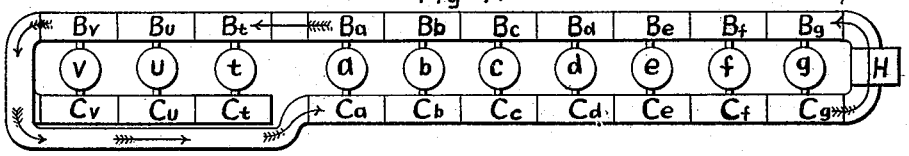
Fig. 8.
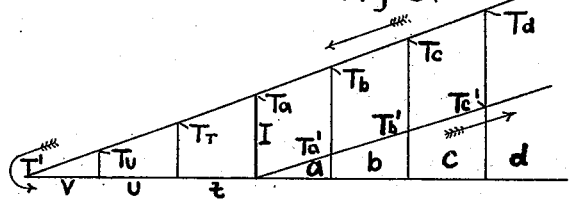
Fig. 9.
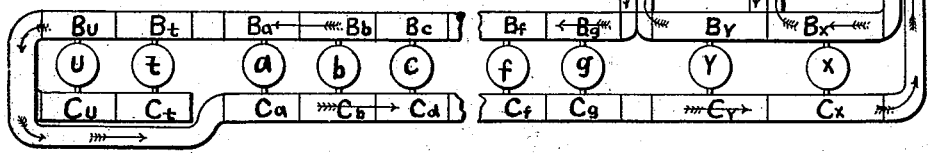
Fig. 10.
Inventor:
Arthur Mellen Wellington
Attest:
C. J. Sawyer
Arthur L. Kent
By Philipp Mauro & Phelps
Attys

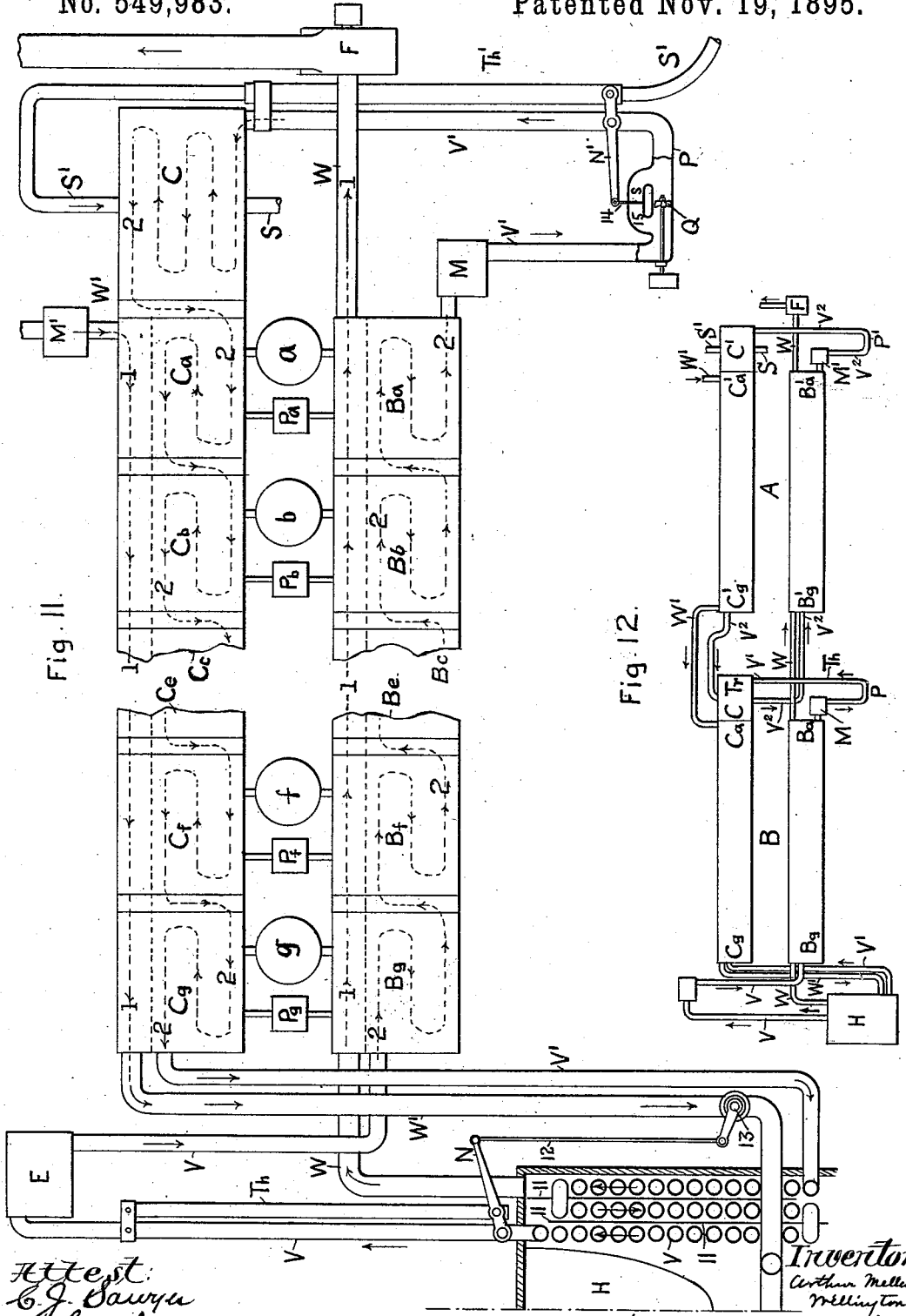

(No Model.) 4 Sheets—Sheet 4.
A. M. WELLINGTON, Dec'd.
A. B. WELLINGTON, Executrix.
THERMODYNAMIC PROCESS AND APPARATUS.
No. 549,983. Patented Nov. 19, 1895.
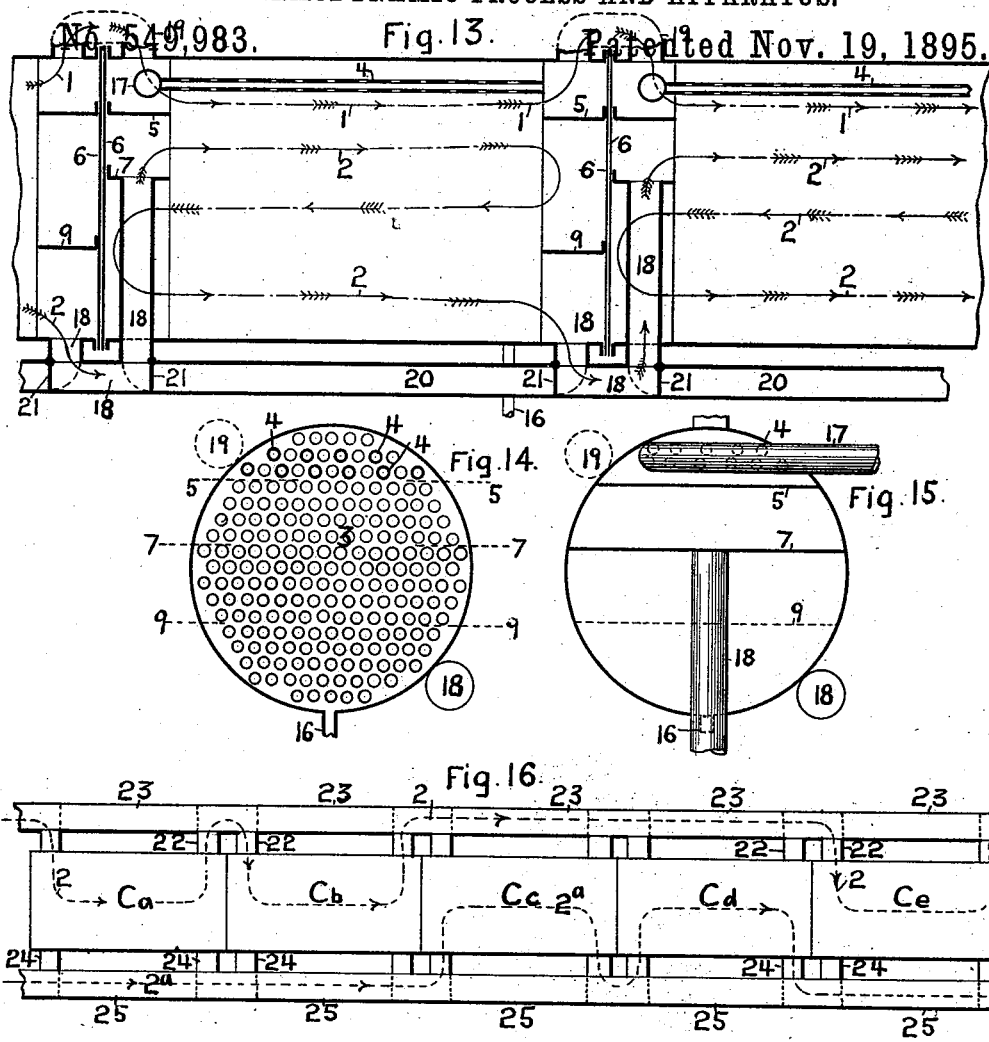
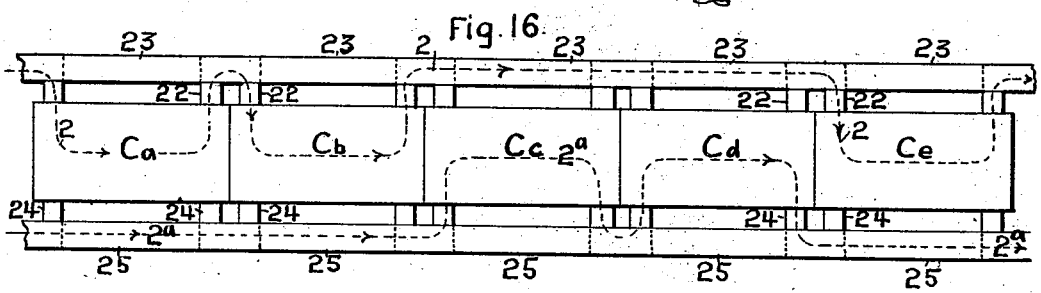
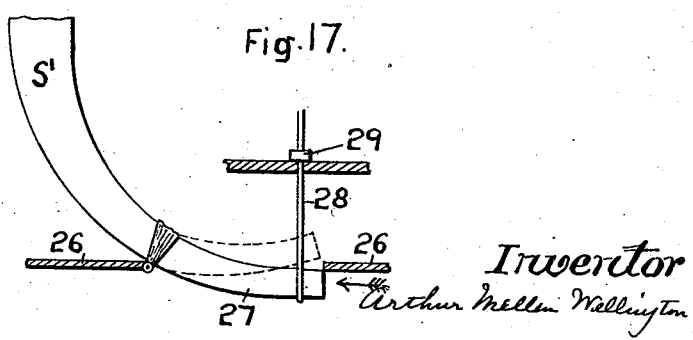
Attest:
C. J. Sawyer
Arthur L. Kent
Inventor
Arthur Mellen Wellington
by Philipp Mauro Phelps
Attys
ANDREW B.GRAHAM. PHOTO-LITHO. WASHINGTON, D.C.

UNITED STATES PATENT OFFICE.

ARTHUR M. WELLINGTON, OF NEW YORK, N. Y.; AGNES BATES WELLINGTON EXECUTRIX OF SAID ARTHUR M. WELLINGTON, DECEASED.

THERMODYNAMIC PROCESS AND APPARATUS.

SPECIFICATION forming part of Letters Patent No. 549,983, dated November 19, 1895.

Application filed June 23, 1894. Renewed April 20, 1895. Serial No. 546,532. (No model.)

*To all whom it may concern:*

Be it known that I, ARTHUR MELLEN WELLINGTON, a citizen of the United States, residing at New York, county of New York, and State of New York, have invented a certain new and useful Thermodynamic Process and Apparatus, fully described and represented in the following specification and the accompanying drawings, forming a part of the same.

The present invention is technically a particular case under a general process for generating vapor-pressure, the basic feature of which is the dissociation of the fire or other irregular source of heat from the boiler or other pressure-generator containing the confined working substance in order that the effective connection of the two may be secured by a heat-conveying substance, herein termed the "circulating fluid," which is passed through the pressure generator or generators, and which in the typical case and except for special reasons is worked in a closed cycle; but whereas this process in its broad or general form relates primarily to the generation of vapor-pressure and is independent of the particular use which may be made of that vapor or of the methods of handling it the particular process and apparatus which constitute the present invention derive their chief economic importance from the combination of the three processes of generating, utilizing, and destroying or condensing vapors in a peculiar way, with the double effect of greatly reducing the size, bulk, first cost, and liability to derangement of the present types of engines and of increasing greatly the percentage of heat supply converted into work, fifty to eighty per cent. of conversion efficiency being attainable, with a large reduction in bulk and cost over the simplest of known types of engines and with the risk of explosion and injury from temperature, strains practically avoided.

This process and apparatus differ so materially from any known forms of steam, air, or gas processes or engines, both in functional action and economic results, that their nature cannot be indicated, even approximately, by applying or extending to them any designation now known to science; but the term "series engine" will be applied to them herein.

An extended description of the theory and various methods of practicing the invention will be necessary to a correct and a full understanding of the process and the apparatus by which it may be carried out; but on account of the wide departure made by the invention from the present art it is thought best to describe a simple form of the process, in connection with diagrams illustrating the same, before proceeding to such extended description, and after completing the latter a detailed description of an apparatus embodying the invention in one of its simpler forms will be given, and the features forming the invention then specifically pointed out in the claims.

In the above descriptions reference will be had to the accompanying drawings, forming a part of this specification, in which—

Figure 1 is a diagram illustrating the principle of the process as applied to a series engine consisting of seven engines. Fig. 2 is a diagram of the temperature conditions in such a series engine. Fig. 3 is a typical indicator diagram showing the preferred method of operating the separate engines in series. Fig. 4 is a diagram illustrating a development employing a plurality of series engines operating at decreasing temperatures. Fig. 5 is a temperature diagram of the same. Fig. 6 is a temperature diagram showing another method of applying the same principle. Fig. 7 is a diagram illustrating the principle of cold-interval engines. Fig. 8 is a temperature diagram of the same. Fig. 9 is a diagram illustrating the principle of combined series, cold-interval, hot-interval, and heating engines. Fig. 10 is a temperature diagram of the same. Fig. 11 shows largely in diagram a complete apparatus of simple form for carrying out the invention with a single series engine. Fig. 12 is a diagram of a similar apparatus with a transmitter, illustrating the action of the latter. Fig. 13 is a longitudinal central section of a portion of the series boilers, showing the general construction. Figs. 14 and 15 are cross-sections on the lines 14 and 15 of Fig. 13. Fig. 16 is a diagram illustrating the interjected circulation. Fig. 17 shows a device for supplying condensing or cooling water.

The principle of the general process will now be described in connection with Figs. 1 to 3.

Let $a\ b\ c\ d\ e\ f\ g$, Fig. 1, be any kind of heat-engines working by the expansive force of a working substance. Let them have either high or low conversion efficiency, separately considered. Let them be either of the same or different size or type, or some of each, and let them use either the same or different working substances. Let each of these engines work within itself in a closed cycle between its boiler $B^a\ B^b$, &c., its condenser $C^a\ C^b$, &c., and its cylinder or other engine $a\ b\ c$, &c.—that is, let steam supplied from the boilers $B^a$, &c., be expanded in the cylinder, thence exhausted into the condensers $C^a$, &c., and there condensed, being returned again in liquid form by a pump to the boilers $B^a$, &c., to repeat the cycle. Let these separate boilers $B^a\ B^b$, &c., be arranged as to their interior passages for the heating substance so as to form for it a continuous passage-way from end to end of the series, and let the boilers be designed to receive heat only from its heating substance and not directly from a fire or other source of heat, which latter is contained only in a heater H apart from the boilers.

In thermal conditions a series of boilers thus arranged bears a close functional resemblance to an ordinary tubular boiler having the barrel very much elongated and divided by sundry water-tight partitions into so many different and separate boilers, having also the "fire-box" or heater H at one end, as usual, but without any of the usual fire-box heating-surfaces for evaporative purposes. It is evident that each one of these separate boilers $B^a$ to $B^g$ may be used to evaporate either the same or a different working substance, but that the conditions naturally tend to a continuously-decreasing scale of temperature as the heater is departed from, and that if the same working substance be used throughout the pressures will tend to be lowest at the cold end and to increase continually as the heater is approached. On the other hand, if highly-volatile working substances be used in $B^a$, &c., at the cold end and highly-unvolatile substances in $B^g$, &c., at the hot end, and we have a sufficient range of choice, we may, if we please, so arrange the working substances as to have in all of a long series of these boilers a nearly constant vapor-pressure despite very material differences of temperature. Each one of these separate chambers $B^a$ to $B^g$ is therefore functionally a separate boiler, though thermally all may be considered to be in a certain sense parts of the same compound boiler. Similarly let all of the separate condensers $C^a\ C^b$, &c., be arranged as to their interior passages for a cooling substance which does all the condensing work so as to form for this substance a continuous passage-way from end to end of the condenser series similar in all essential respects to the boilers, but having the current through it in the reverse direction—i. e., toward the heater instead of away from it. It is evident that under these conditions the condensers, as well as the boilers, will grow hotter toward the heater—i. e., the hottest condenser will be opposite the hottest boiler and the coldest opposite the coldest boiler.

Let the passages through the condenser-circuit and the passages through the boiler-circuit be connected together at the "hot end" in a heater H, where heat can be supplied, and let them be connected together at the "cold end" in a cooler C, Fig. 1, where a certain amount of heat can be abstracted, thus forming a closed circulating-circuit exterior to the several engines and including in order the condensers, heater, boilers, cooler, and condensers again, as indicated by the arrows of Figs. 1 and 2.

Let a heat-conveying substance or circulating fluid, of specific heat 1.0 always assumed unless otherwise stated and of mass per stroke V, be continuously circulating through this exterior circuit in a closed cycle and in the direction of the arrows of Figs. 1 and 2, as follows, the cycle of temperatures being as indicated graphically in Fig. 2: Issuing from the cooler C at the nearest convenient approach to the natural minimum temperature for the time being, $T'$, which is the only thermal point in the process fixed by external conditions, and therefore, as well as for other reasons, the natural starting-point, the mass V passes through condenser $C^a$, Fig. 1, where it receives the heat due to the condensation of one stroke of exhaust-steam, being raised in temperature thereby from $T'$ to $T'^a$, in practice 2° to 40° centigrade, according to the size of the engine and mass V. Moving continuously on at uniform speed it then passes through the next condenser $C^b$, where it receives the exhaust-heat from one stroke of engine $b$, which works between temperatures 2° to 40° centigrade higher than engine $a$ to enable it to do so. The mass V is thereby still further raised in temperature from $T'^a$ to $T'^b$. So it goes on through all the condensers in series or "cold circuit," having been thereby raised in temperature to $T'^g$, or enough to absorb the entire heat rejected by one stroke of all the engines. The circulating fluid thus receives $V(T'^g - T')$ units of heat, which may be eighty-five to ninety-five per cent. of the heat originally supplied to one stroke of all the engines, the remaining fifteen to five per cent. having been converted into work.

It will be seen later that it is not really economical to seek for the highest possible percentage of heat conversion from each of these several engines; rather the engine as a whole is more economical if the several cylinders have a relatively late cut-off, and consequently a low percentage of heat converted into work.

The mass V at temperature T'ᵍ then enters the heater H, which should not be an indefinite storehouse or magazine of heat, like present types of boilers, but rather have its fires of gas or coal so governed as to heat the mass V only to some desired and for the time being constant maximum T, no heat being stored. Issuing from H at the temperature T the mass V then enters the first boiler Bᵍ, where it supplies the heat necessary for one stroke of the engine $g$, being thereby cooled to T'ᵍ. Thence it passes on through all the boilers in succession, surrendering heat for one stroke to each, finally leaving the last boiler Bᵃ at some temperature Tᵃ which is so regulated as to give any desired "cold interval" I above the cold temperature T' of engine $a$, so as to afford a suitable "working interval" between the hot and cold temperatures of the coldest engine. This working interval may ordinarily be about 30° centigrade, but may be increased or decreased within wide limits without affecting the nature of the process. Finally the mass V, having surrendered all its heat deemed capable of useful work, enters the cooler C, where I degrees of heat (IV heat-units) are abstracted from it and rejected in order to reduce the mass V again to its original temperature T', at which temperature it again issues from the cooler to repeat its circuit. The heat thus abstracted and rejected in the cooler is an unavoidable waste to create the cold interval which enables the engine to work at all.

Furthermore, let each of the several engines, instead of working between its given temperatures in the usual manner of single-cylinder engines, so as to give a diagram like the outer lines of Fig. 3, be working so as to give a diagram like the shaded area only, corresponding more nearly, though still imperfectly, to the high-pressure diagrams of compound engines—that is to say, let the steam be admitted from the boiler at the pressure corresponding to its effective temperature Tⁿ, cooled by expansion and work only down to the pressure corresponding to its condensing temperature Tⁿ'. This condensing temperature and pressure may be and ordinarily will be pretty high. It will be seen more clearly later that it is ordinarily economical to have it so; but whether high or low we extract from the steam in this way all the work which is possible between the given temperatures, which is all we require.

For convenience certain terms that require definition are used herein, and the above description and diagrams make the following clear. The engine at the cold end—i. e., nearest to the cooler—is hereinafter termed the "cold engine," and the engine at the hot end, or nearest to the heater, is termed the "hot engine." Their several boilers and condensers are correspondingly designated as "cold" or "hot." The interval of temperature within the whole series T to T' is termed the "thermal range," in distinction from the working interval I to I' of the separate engines at any point. The boiler circulating-passages are termed collectively the "hot circuit" and spoken of as on the "hot side," while the condenser circulating-passages are correspondingly designated as the "cold circuit" or the "cold side." Other new terms will be explained as they arise.

Proceeding now to a full description of the theory and methods of practicing the process, a number of the theoretical properties of the process and engine in the form outlined above require to be explained.

It will be seen that each single engine in Figs. 1 and 2, separately considered, uses its own special heat with perfect efficiency, barring external radiation and interior conduction, since all the heat it receives is either converted into work or passed on to the cold circuit undegraded in temperature except by the process of expansion and used over again later without degradation of temperature in that circuit. No one of the engines voids any heat externally at any temperature or degrades any in temperature except by the process of expansive work, but all the heat voided externally or degraded wastefully is voided through the cooler from the circulatory system only and not from the several engines.

The efficiency of the series as a whole is measured approximately, and, with a small correction for external radiation, exactly by the ratio of the hot interval I' or heat supplied to the cold interval I or heat voided without conversion into work, the ratio of heat wasted being $\frac{I}{I'}$ and the ratio of economy or of heat converted into work being $\frac{I'-I}{I'}$. The percentage of economy with which the engine is working for the time being may therefore be determined at any moment from thermometric observations only. It will be seen, also, that the quantity of heat to be rejected in the cooler is entirely independent of the number of engines in series or of the total thermal range T to T'. Whatever the number of engines in series, the rejection for the cold interval must still be the same, I, Fig. 2, remaining constant, being that required to give a suitable working interval for the cold engine, which may be 10° to 50° centigrade. For example, we may extend Fig. 2 indefinitely to the right by prolonging the inclined lines and pushing I' farther outward and upward without changing the conditions of the original series, as shown. This working interval once fixed for the cold engine, it widens continuously toward the hot end from the nature of the process, because each "hot increment" or change of temperature from one boiler to the next above it must necessarily exceed the "cold increment" or change of temperature from one condenser to the next above it by the degree required to supply the heat for work ($w^a$ to $w^g$, Fig. 2) to that engine. Toward the hot end the working interval is thus materially increased. If the series be working with an efficiency of fifty per cent., the hot interval is 2 I; if with an efficiency of forty per cent., the hot interval is 1.67 I, &c. Thus the cold interval may properly be made narrower than it otherwise might, especially in a long series, as the original working interval continuously widens toward the hot end.

If we divide the series into two parts by a vertical line at any point in Fig. 2, it will be seen that all the rejection of heat from the system is confined to the cold side of the line. All the engines on the hot side, taken as a whole, as well as individually, are working absolutely with complete efficiency—that is, if we cut them off we lose all their work, but we save only the heat which they were actually converting into work. The general thermal waste of the system, which is confined to the cooler, remains undiminished. Therefore if we extend the series by adding more engines, which extend the thermal range, as may be indicated by mentally prolonging the inclined lines on Fig. 2, the heat wasted in the cooler is not increased, and the heat supplied needs to be increased only by the amount actually converted into work by these engines. In other words, if we have given any part of the cold end of a series, even if it be only the cooler itself, every engine added on the hot side of it which increases the thermal range, as in Fig. 2, demands only so much more heat as it actually converts into work, and hence works with complete efficiency. This is an important and fundamental fact, which must be always borne in mind. It may appear from this as if the economy depended solely or chiefly on the number of engines in series; but this is true only with important limitations. Practically it is neither necessary nor expedient to use many engines in series—rarely more than six to twelve. For any given thermal range T to T' and any given cold interval I the theoretical economy of a series cannot be either increased or diminished by varying the number of engines within the given thermal range. Thus by doubling the number of engines, as shown by the interpolated dotted verticals in Fig. 2, and also doubling the circulating mass V per stroke we shall double the power; but we shall also double the quantity of heat supplied and voided per stroke, the economy and temperature scale remaining constant, but the hot and cold increments being halved. The economy of such a series is also not materially affected by varying the cold interval if we permit the work W, and hence the maximum temperature T, to vary correspondingly, as they naturally do. In that case we simply vary the vertical scale of Fig. 2, barring thermodynamic fractions, and leave our economy substantially as it was. Within moderate limits the same is true of changes in the cold interval I only, the maximum temperature T remaining constant. From the general equation of efficiency, based on the Carnot theorem, it follows that, the maximum and minimum temperature T and T' being constant, there should be always a slight increase in the percentage of economy by decreasing the cold interval I, since we decrease the quantity of heat which is voided wastefully at a temperature higher than the minimum T', and vice versa for an increase therein; but the value of the negative term which expresses this loss in the equation of efficiency is relatively small in any case, and hence moderate variations of the cold interval I alone will not materially modify the economy, though they will largely vary the work W. On the other hand, to vary the work of the series by increasing or decreasing the maximum temperature T should, by the general theory of Carnot, vary the percentage of economy in almost direct ratio thereto, and it does, in fact, do so, as will appear more fully later. If the normal value of the maximum temperature T be made as high as the materials conveniently permit, which economy requires, it is not possible to increase the maximum materially; but it may be decreased *ad libitum*, and as a moderate increase or decrease will materially modify the working pressure and consequent power developed it is possible, though not expedient, to work with a constant cold interval I and an automatically-regulated or hand-regulated maximum temperature. In this case the cold interval I is kept constant by regulating the speed of circulation, the circulation being checked when I tends to increase and accelerated when I falls too low. A better method of regulation in most cases, however, is to maintain the maximum temperature T constant for the time being by any regulative method and to regulate the work of the engine by automatically or otherwise varying the cold interval I by varying the speed of circulation, all as hereinafter fully explained. It will be understood that the regulation here referred to is not that from moment to moment, which is effected in the usual way by any form of engine-governor, but that which is desirable from day to day or hour to hour to adapt the engine to the average load for the time being.

The economy of the engine depends quite largely on selecting the best cold interval for a given output of power. Almost any combination of these is possible under the theory of the engine; but only a few are expedient, the rest being relatively wasteful.

The power of the series may be almost instantly destroyed by reversing the direction of the circulation. The normal speed required for circulation being slow, it may be very suddenly checked and reversed. After it has moved a few feet backward all generation of steam and all condensation ceases, since the thermal head is so small in the best practice that a slight backward movement makes the circulation colder than the steam on the hot side and hotter than the exhaust on the cold side. After moving a few feet more the action of the boilers and condensers becomes reversed, and hence the cylinders become compressors, the engine working steadily against a pressure instead of with it. To the end that this may be so it is not desirable to drain the condensers too completely of liquid working substance when it is desired to utilize this possibility. This reversal may be effected, when a circulating-pump is used, by reversing the pump or by having a small pump for this special purpose, which may even be a hand-pump, since merely stopping the circulation makes the engine dead in a few strokes.

It is a very important, in fact fundamental, principle of design to reduce the "thermal head" or difference of temperature between the heating and the heated substances to the lowest attainable limits. In present ordinary practice this thermal head runs up to several hundred degrees, and cannot be determined exactly for the reason that it varies enormously both in different parts of the boiler and in the same part at different times. It is a leading advantage of the peculiar method of generating vapor-pressure by a circulating fluid, as heretofore described, that for a combination of reasons it reduces this thermal head largely—say to 50° to 80° centigrade—while at the same time practically eliminating the boiler as a factor in the bulk and weight of engines; but for this series process it is desirable to reduce the thermal head further yet—say, preferably, to 2° to 10° centigrade—for which reason I prefer to use boilers having from ten to twenty times as much surface per horse-power as is necessary or useful when their steam is to be used in the now recognized ways—that is to say, I use from twenty to forty square feet per horse-power for engines in series, whereas for mere steam-generating purposes two square feet is ample, calling for some 40° centigrade of thermal head only; but as I may obtain with ease one hundred to one hundred and twenty square feet of heating-surface per cubic foot of boiler it will be seen that even after this large increase of surface the boilers still remain of insignificant bulk compared with those of present practice, since they give from three to six horse-power per cubic foot instead of requiring that many cubic feet per horse-power, as do approved present types of boilers.

The objection to a large thermal head is that if it exists on the hot side it must exist on the cold side also to about the same extent and that the circulating fluid must be cooled wastefully in the cooler through the number of degrees represented by these two thermal heads, as well as through the theoretical cold interval which represents the interior interval for work of the cold engine. In order to maintain in practice the interior working intervals of a theoretical series working without thermal head therefore, the hot circulation must be made hotter and the cold circulation colder by a number of degrees equal to the thermal head, and this extra heat does absolutely no work except to give the necessary thermal head to force heat through boiler and condenser surfaces at the required rate. If the thermal head be large, it may materially decrease the percentage of economy, though the loss from this cause is not so serious as might appear at first sight. By doubling the cold interval rejection because of the thermal heads, for example, in a series which would otherwise work with fifty per cent. economy we by no means halve the percentage of economy, but only reduce it by one-third, or to thirty-three and one-third per cent. economy, and the higher the efficiency of the series otherwise the less the percentage of waste from given thermal heads.

It is not essential and often not expedient that the circulating fluid should pass directly from the cold circuit to the heater but a part or all of the circulating fluid after it has passed through the cold circuit, and thus been reheated nearly to its original temperature, may be used as the hot circulation of a new series of somewhat smaller thermal range before returning it to the heater to be reheated, and this may be done a number of times until the entire thermal interval is exhausted. This is termed the "multiple-series" process.

Fig. 4 is a diagram showing the circulating fluid thus used with two series S S', and Fig. 5 a temperature diagram showing the use in this manner of substantially the entire thermal range. In such multiple series separate coolers are required for the different series, which may work with the same or different cold intervals; but a single heater serves for all the series. The advantage thus secured is that the same heat supply is used over and over, thus obtaining much more power from a single heater, and that the circulating fluid when it finally enters the heater is very much colder, and so can cool the gases of combustion down to a very much lower point before discharge, and the same heater may thus be made to furnish correspondingly more power, either in emergencies only or regularly. The disadvantage of this multiple-series process is that the mean efficiency of heat conversion is not increased, but decreased, each succeeding series of engines being of lower efficiency than the one above it, because of smaller thermal range. It is therefore better, when it can be done, to utilize the entire heat supply generated by the heater in working a single series, as may always be done by making the air supply and gases of combustion a part of the circulating fluid, as hereinafter described; but when special conditions make this inexpedient or impossible the use of such multiple series may often be highly economical in practice. Nor is it necessary to use additional mechanisms to obtain this multiplication of power at the expense of economy, provided only that we may gain the power by increased piston speed, or mainly so. In that case we may carry out this multiple-series principle with a single series of engines by the sub-circuit modification, as follows and as shown in diagram in Fig. 6: After the circulating fluid has made its first circuit, instead of passing it to the heater at the temperature and point $T'^{n'}$ we may introduce it again into the hot circuit at or near the point where the hot circulation attains this temperature, and thus send the mass V around on a second shorter circuit. Similarly when this mass has completed its second circuit we may either pass it to the heater to be reheated or again re-enter it into the hot circuit at the point of corresponding temperature, and send it around on still a second sub-circuit, and so on through successive temperatures $T'^{m} T'^{l}$ until it has attained some temperature $T'^{k}$ which is too cold to warrant another circuit, when finally it is passed to the heater. In this manner both the speed of circulation and the power developed are multiplied and caused to vary about as the number of arrows shown along the hot circuit. The normal speed of circulation is so slow that this increase, although it is fourfold or more at the cold end, involves no inconvenience or special appliances, while the power developed is mutiplied largely, the mass of circulating fluid being cooled several times, though reheated only once, so that the tax upon the heater is not sensibly increased, and the moderate sacrifice of economy, at least in emergencies, may be no consideration.

The otherwise great field for the application of this principle of multiple series is limited by the fact that all heat produced by combustion is initially high-temperature heat, and if careful arrangements are made to collect and utilize this heat at a high temperature, as by allowing most of it to radiate directly from the fires to the circulating-pipes, there need be no sensible loss in the fact that the substances to be heated are themselves received at a pretty high temperature; but as such arrangements rarely are perfect and as the advantage of using the same heat over and over still remains there is a considerable field for the application of this principle.

The power of a series may be instantaneously doubled or tripled, at the expense of economy, by providing a by-pass for the circulating fluid on the cold side to carry it past one or more of the condensers and substituting in lieu thereof a cold injection of the ordinary kind through the tubes of those condensers which reject and waste the heat. In this way, although the temperature changes in each condenser are only 30° to 40° centigrade, all the higher engines may work through a very great range, with corresponding increase in the power developed by them, though with a change of only 30° centigrade, more or less, in the condensing temperatures. To take advantage of this possibility to the fullest extent and for any length of time, it will ordinarily be necessary to provide for supplementary heaters, as tripling the power in this way might multiply the coal consumption tenfold or more; but in emergencies, when economy is no object, the possibility of this operation is of great value and easily provided for. It tends directly to economy, especially in war vessels, by making considerably smaller engines than would otherwise be used adequate for all emergencies.

In broad distinction from ordinary types of engines, which must work at a nearly constant and full power or fall off heavily in economy, a series engine is of no particular horse-power and works or may work with its highest economy when producing but little power. This last results from the fact that as the governor will then cut off earlier less steam will be used, and hence the quantity required will be produced from the large heating-surfaces with a proportionately reduced thermal head, which at times may be hardly more than nominal; but we may increase such a nominal thermal head five to ten fold, with an approximately proportional increase of steam supply and horse-power, and still not increase the thermal head to a point which seriously sacrifices economy, while by temporarily disregarding economy we may increase it twelve to twenty fold. For naval engines and many others this peculiar property is deemed of great importance.

The general theory of the process and resulting engine having been explained, we will now consider more fully the general methods of carrying the invention into practice.

The separate engines or cylinders which are the immediate sources of power may be of any suitable type, no change being required from ordinary methods of construction so far as these features are concerned. Two or more cylinders or their equivalents must be used together to convert them as a whole into the new type of engine; but these primary cylinders or engines may each individually be of any known or unknown type obtaining power from the expansion and consequent cooling of a hot working substance, whether steam-engines, hot-air engines, gas-engines, or any other kind of expansion-heat engines, so long as they conform to certain simple conditions to be enumerated and fitting them for this special use.

The separate engines may either be all alike or all different in type or size, or both. Practically, for mechanical reasons, the engines of any given series should ordinarily resemble each other, but functionally this is indifferent. It will probably be found preferable, as a rule, that the separate engines or cylinders should be a number of ordinary late-cut-off single-cylinder steam-engines of simple type, all of one size and working at pretty high and nearly constant pressures, but between slightly different temperatures, which decrease toward the cold end. All these conditions may be varied within wide limits, however, and it is possible that in some cases the best practice will be that no two engines will be of the same type or size. It is also possible that some development of steam-turbines or rotary engines may prove more suitable for this process than any other form of engine.

The process may be used with pressure-generators of many different forms and some of the possible advantages secured; but it is practically necessary that the pressure-generators should be of the special construction and functional action herein described and should embody the following features in addition to that of being served by a circulating fluid: The circulating fluid should be applied first to the hotter parts and then to the colder parts of the working substance, being passed downward from top to bottom of the boiler, the passage downward being circuitous through passages forming uniformly-distributed and closely-spaced heating-surfaces and preferably filling both the steam and water space.

By "uniform distribution" is meant such distribution of the heating-surfaces that all of the vertical columns into which the water in the boiler may be conceived to be divided between such heating-surfaces and between the heating-surfaces and the boiler-shell shall receive substantially the same proportion of heat, and so be of the same mean temperature and density, and no cold spaces be left for downward circulation, as in the boilers now in use, to the end that no circulation or tendency thereto may exist. The distribution of the space between the heating-surfaces and between the heating-surfaces and boiler-shell will depend upon the nature and size of the heating-surfaces employed. If tubes be used and they are of the same size throughout the boiler, the spacing will be equal; but the spacing may and preferably should increase somewhat with the size of the tubes if different-sized tubes be used. By "closely-spaced" is meant that the heating-surfaces must be spaced at such distances apart as to avoid the formation of any cold interspaces through which downward circulation may be set up. The effect of this construction is that the working substance is at different temperatures and densities throughout in horizontal layers, lightest at the top and heaviest at the bottom, and therefore actively resists and prevents any circulation which the pressure generation might otherwise cause. By thus avoiding the tendency and need for circulation of the working substance it will easily be seen that we secure many important advantages. Thus we may reduce the contained quantity of working substance, as we need no large liquid mass to receive irregular heat impacts, because we have none, and we need no such mass to prevent excessive steam generation at particular points or moments, because our steam generation, if excessive, is not affected by interior volume and must be controlled in other ways. We need no wide spacing of tubes for interior circulation, and the tubes therefore may be and preferably are very closely spaced, whatever their size, thus enabling the whole interior of the boiler to be practically filled with heating-surface. The heating and heated substances are carried in opposing currents past each other, and by thus introducing differential temperatures within the chamber we reduce largely the mean thermal head by enabling the heating substance to be discharged colder than the heated substance, which is of great importance in this process. Moreover, as the tubes no longer need to be widely spaced or thick to let gases of combustion through freely or to facilitate circulation or to resist temperature-strains or abrasion of cinders, they may and should be quite small to decrease the weight and increase the heating area.

So far as I yet know one-fourth inch copper tubes are very suitable for any size of boilers, if tubes are used; but larger sizes may often be usefully employed, and perhaps longer experience will indicate that larger or smaller tubes than I now favor are preferable.

It is of importance that the heat-transmitting surface be thin, and they preferably have only the thickness and range of thickness of good stout paper—say from one-fifth to one millimeter—although it is obvious that this thickness may be increased somewhat without great loss of efficiency. These thin surfaces not only secure the advantage of providing a large amount of heating-surface in small space, thus economizing space as well as weight, but also aid directly toward obtaining a very small thermal head between the temperature of the effluent hot vapor and the temperature of the incoming circulating fluid by which said vapor is heated, and if the application or removal of the heat or both be intermittent the thinness of the surfaces will materially increase the quantity of heat which will pass during the intermittent instants when the conditions are most favorable for transmission, and such intermittent application and removal of the heat naturally occurs in the operation of most engines.

So different is the proper thickness and spacing of heating-surfaces desirable under my process from anything in use that these surfaces can hardly be too closely spaced, if the best results are to be secured, whereas the now usual process of steam-generation and of condensation as well, which depends upon circulation of the working substance and treats the interior as a single chamber to be subjected to uniform temperature conditions demands in all cases quite wide spaces. If tubes are to be used, so different are those recommended—say one-third millimeter thick and six to eight millimeters diameter—from any of present practice that I have found them obtainable only from manufacturers of metal pencil-cases, and, while it is difficult to define the limits of thickness and size of tubes, they cannot be said to be thin and small in the sense in which these terms are used herein unless far thinner and smaller than any condensing-tubes of current practice. The boiler-surfaces need not be tubes at all, however; but on account of ease of mechanical construction may, preferably, be a mass of thin flat plates closely spaced and indented or corrugated, so as to keep their spacing against opposing pressures of different amounts.

I have found that the boiler will ordinarily give the best results when two-thirds to four-fifths full of liquid, since there is no tendency to foam, despite the close spacing, and it is better to have a considerable area of heating-surface, perhaps ten to fifteen per cent. of the whole, devoted to superheating uses alone.

As we have no need for any steam-space beyond what is required for generating and superheating the steam, it follows from all that has preceded that the best boiler for use in this process will consist of a mass of thin and delicate heating-surfaces, filling "steam-space" and "water-space" alike, without any distinction between them, with no greater total bulk than is needed to insure enough heating-surface, with the circulating fluid or heating substance entering hot at the top and working its way downward to the bottom, and with the working substance entering cold at the bottom and leaving hot at the top without circulation.

Other details may be varied at pleasure within wide limits, as also the character of the heating-surfaces; but the character and arrangement of surfaces described will be found to secure many advantages.

The same principles are preferably applied in the construction of the condensers, the exhaust from the engines entering at the top and passing out at the bottom, and the cooled circulating fluid entering at the bottom and passing out at the top. This is so strictly true that in all their details the condensers and boilers are interchangeable duplicates in my present practice, and coolers and transmitters, if used at all, are also interchangeable duplicates of the boilers and condensers.

As above stated, the invention is based upon the dissociation of the fire or other irregular source of heat from the pressure-generators and the effective connection of the two by the circulating fluid. It will be understood, however, that the "dissociation" is simply a thermal dissociation, which may or may not be mechanical, also. Ordinarily, two parts which are intended to be thermally dissociated should not be mechanically contiguous, but mechanical convenience may often render this expedient, even at some slight sacrifice of thermal dissociation. Whenever the source of heat and the working substance are so disposed that the circulating fluid may serve as the effective thermal connection between them, to the exclusion of interference by unregulated heat with the moderate and controllable action of the circulating fluid, so far as is practical, the source of heat and working substance are thermally "dissociated" within the meaning of the term as used herein, although there may be some considerable residue of direct action of the one upon the other by conduction of heat through common metallic parts or otherwise. It is not absolutely essential that all the boilers should be thermally dissociated and supplied with heat from the circulating fluid. The hot boiler might, if desired, be exposed to the direct heat of a fire which also heats the circulating fluid, but to a lower temperature than that required for the hot boiler. Special circumstances may render this expedient occasionally, but ordinarily it would be disadvantageous.

The working substances may be used either in closed or open cycle, but it will usually be found expedient to use them in closed cycle, especially as the working substance will rarely be water, but ordinarily some more or less costly or noxious substance, like the petroleum distillates, vaporizing at higher or lower temperatures than water, so that economy of supply is more important than with water.

The circulating fluid may be a liquid, or it may be solid or gaseous in part or whole, and its sole function as a part of this process is to convey heat to the working substances in the successive pressure-generators, and abstract heat from the exhaust in the successive condensers by flowing around in the passage-ways described, the circulating fluid being preferably in continuous motion, and under more or less careful regulation as to speed and temperature. Having such a hot fluid in motion, however, it may at times be convenient to take some heat from it for some other use, and certain gains to this process may at times result from doing so. The circulating fluid may consist either of one or of several different heat-conveying substances circulated either as a common mass, or, as is often expedient for practical reasons, in two or more distinct sets of passage-ways, but in either case it is spoken of collectively as the "circulating fluid."

Some part of the circulating fluid, if not all, will usually be employed in closed cycle, being alternately heated to a desired or convenient point, ordinarily not exceeding 300° to 425° centigrade, passed around the circuit, as described, and directly or indirectly returned to the heater to be reheated. In certain cases, however, it is inexpedient to use over and over a single mass of circulating fluid. For instance, an external mass of air or water may often be drawn upon with advantage for the circulating fluid and used in open cycle, a fresh mass of this existing supply being continuously received at the cold end of the cold circuit and passed through the cold-circuit heater and hot circuit to the cold end of the latter, where it is discharged to waste, hotter than received, or used for any purpose desired, such as heating ships or buildings, and the temperature at which it is discharged will ordinarily adapt it to such use. In all cases, moreover, in which fire is used for heat a continuous supply of fresh air must be taken into the heater to support combustion, and the gas thus used may most advantageously be made a part of the circulating fluid in the manner described. With care to insure that this gas shall be cooled down to a reasonably uniform and moderate temperature before entering the hot circuit it not only may be but in large plants should be used as a part of the circulating fluid, and if so used it must be used in open cycle, even though the rest of the circulating fluid is used in closed cycle.

Suitable circulating fluids in the order of their usual merit are water, air, or other gas under atmospheric or higher pressures and paraffine or other oils; but it is not necessary, and as a rule not expedient, that the circulating fluid shall consist wholly of either air or a liquid. A mixed circulation consisting in part of each is in general recommended. The advantage to be had from each substance may thus be in large measure secured and the disadvantage of each eliminated. To this end the air circulation should be made sufficient in volume only to support combustion properly. It is not necessary to calculate very closely, since the theory of the engine warrants and requires that the products of combustion shall be lowered in temperature even more than they are likely to be by any probable air excess before they are permitted to enter the pressure-generators. Because of the lower heat efficiency of the passages carrying this air, however, as few as possible of them should be devoted to the air circulation in excess of what is required to supply air for combustion. Ordinarily, some ten per cent. of the heating-surfaces at most may suffice for this use, as the speed of the air through them may be high. All the remainder of the circulating passage-ways may then be devoted to liquid-closed cycle circulation, and, therefore, as a net result we obtain from nine-tenths, more or less, of our heating-surface the highest transmitting efficiency, while still retaining that complete combustion economy which is obtainable only by using air in the circulating fluid; nor is it necessary that any of the interior heating-surface of the pressure-generators should be given up to this air circulation, as a nearly identical though less perfect thermal action may be obtained by passing the air circulation through passages around the shell of the pressure-generators. The most serious objection to doing so is that this sacrifices part of the advantage of a double circulation, as follows:

It is not necessary or expedient to have the two circulations at exactly the same temperature. It is a practical convenience to have the combustion products at a higher temperature than the liquid circulation, and by passing this hotter circulation through the tops of the boilers only this gives an easy way of further superheating all steam just before it is used, as shown later, as also to jacket the engine-cylinders with a higher temperature than is otherwise possible.

When part or all of the circulation is air used in open cycle as a supporter of combustion as well as a circulating fluid, and when the fuel used is gaseous or liquid, or solid particles in the form of dust, a further improvement may be effected by passing the fuel as well as the air through the cold circuit on its way to the heater, the fuel being already mixed with the air or uniting with the latter at the heater. In this way the two may be heated to quite a high temperature before combustion and the thermal balance between the hot and cold circuit is better preserved, since the same fuel also goes through the hot circuit in the form of gases of combustion. In theory this should be done with any fuel, but with solid fuel it is impracticable under ordinary conditions.

An important and conspicuous advantage of the process in all its forms is that it readily admits of working through a very wide range of temperature, not only without disadvantage, but with an actual advantage—that is to say, working through 200° centigrade, instead of only 100° centigrade, does not even require that the bulk of the engine as measured in cylinder volumes shall be doubled, whereas to increase the range of present types of engines even one-half this amount requires, even in theory, that their bulk shall be increased eight-fold, and practically it is not possible to do this at all.

The reason for the rapid and prohibitory increase in bulk in present practice as the thermal range is increased lies simply in the fact that with high ratios of expansion and wide thermal ranges the terminal pressures become so low that enormous cylinder volumes and piston areas are required to get a very little more work. Therefore the practical advantage of wide thermal ranges in existing types of engines are exhausted long before the theoretical limit is reached, even if we assume that the full theoretical gain from expansion can be realized in practice; but when we consider also the heavy internal losses from theoretical efficiency, which increase much faster than the ratio of expansion, the practical limit is reached much sooner; but in the new process of the present invention the mean effective pressures and ratios of expansion are or may be made quite independent of the number of separate cylinders or engines and of the total thermal range by a proper choice of working substance, of which there is an indefinite supply. It follows that we may increase our thermal range at either end by adding more engines without any increase in engine-bulk per unit of work, and hence without mechanical disadvantage. As we have already seen, the ratio of the hot interval to the cold interval, and hence the mean working interval of the engines in proportion to the cold interval rejection, is greater the longer the series and total range; but the work done by each engine for a given heat-supply varies within our required limits almost exactly with its working interval. Therefore we can either decrease our cold interval rejections as we lengthen our series and thermal range or keep it unchanged and increase our mean working interval, with the final result that the total cylinder volume for the highest economy increases somewhat less rapidly than the thermal range, instead of more rapidly than the square of that range, as do the present type of engines when the range is at all extended.

Now there is a point in the design of engines at which on a balance of all considerations of first cost, durability, steam economy, &c., either increasing or decreasing the size of a cylinder for given unit pressures gives a less economical engine. The point is not well defined, for the reason that there is a considerable range on each side of it within which the exact size of the cylinder matters little. It is only very large or very small cylinders which are distinctly uneconomical. These limits of reasonable economy should not be exceeded, but within these limits it is or should be a fundamental principle of design under this process that many small engines—i. e., cylinders—working through a wide thermal range collectively, but through a small working interval individually, are vastly more economical than a few large engines or cylinders working through a smaller range, and not only will they generate a given power with less coal, but they will within the limits defined generate it with less percentage of loss by friction and with less total bulk, weight, and cost. It follows from these facts that the desired thermal range is likely to be several hundred degrees in all important and well-designed series, which makes it more than possible that even paraffine-oil or other like liquid will not permit of using all desired temperatures in the circulating fluid without physical change in it. If so, it will then be necessary to use two or more circulating liquids, boiling or freezing at quite different temperatures, in order to cover the range desired. This may be effected without any change of theoretical conditions, and with but little practical inconvenience by using one or more "transmitters" having the function of heating up the colder circulating fluid, so as to fit it to pass from the cold to the hot circuit by the act of cooling down the hot circulating fluid, so as to fit it to pass from the hot to the cold circuit. The heat is merely transferred from one circulating fluid to the other, and as the transfer is made only for mechanical or chemical reasons, and has no thermodynamic significance, the two circulating fluids must necessarily have the same mass V per stroke, and theoretically it it is only necessary to pass the two currents by each other in opposite directions and in sufficiently intimate contact to have each assume the temperature of the other on leaving the transmitter, which may be approached practically within a few degrees. In mecanical construction under this process boilers, condensers, coolers, and transmitters are preferably interchangeable duplicates of each other, all having the common function of transmitting heat from one fluid to another through metallic walls with the least possible and a small thermal head to effect the transfer. This broad principle may of course be occasionally varied from in practice, but ordinarily to no greater extent than to vary the quantity of heating-surface.

As above stated, the separate engines of the series will usually be worked in closed cycle, or with boiler and condenser, so as to enable a small and constant mass of working fluid to be used over and over, enabling the fluid to be used regardless of cost, scarcity, or noxiousness when free, the circulating fluid being applied to condense the working substances and receive the heat rejected therefrom. Certain important advantages, however, may frequently be realized by omitting condensers from certain engines of the series when a part or all of the circulating fluid is air or water used in open cycle and the working substance of any particular engine or engines is any abundant and harmless substance. In such case that particular engine or engines may be worked high pressure in the usual way, a new mass of hot working substance being received at each stroke, expanded as far as convenient, and rejected in this slightly-cooled state into the open-cycle circulation, where all heat still remaining in it above the minimum is utilized, so that the heat of vaporization, as well as the sensible heat, is utilized in the series. The application of this principle is subject to the limitation hereinafter explained, that no large part of the circulating fluid can be a condensable vapor; but without exceeding this limitation certain important advantages may be secured, among which are the following: Condensers for such engines may be dispensed with. The thermal range of the hotter engines of the series is increased. There is no loss due to the condensing back-pressure of the condensers dispensed with. The average temperature of the circulation is decreased, so that the voiding air-temperatures of the heater may be higher, and consequently the heating-surfaces of the heater smaller and its bulk less. The air circulation is enriched and may consist in part of steam, so that it will transmit more heat for given volume and surface and the bulk of the boilers be less. By giving this exhaust-jet the right direction an induced current may be set up sufficient to maintain the necessary open-circuit air circulation or to give the desired draft for the fires if there be no such circulation, thus dispensing with a suction or other fan and simplifying the mechanism. Moreover, these non-condensing engines may be wholly external to and separate from the series, and yet the thermal conditions will permit of using their steam with as great efficiency as if so many engines had been added to the series. Thus one or more engines and boilers of the usual or any suitable type may be placed in any convenient position relatively to the series engine and the air supply for these engines, and preferably the water supply also, be carried through the cold circuit, the products of combustion being voided, as is now usual, resulting, of course, in the usual boiler loss of twenty-five per cent., more or less. If the steam from these boilers be worked non-condensing through their separate engines and after exhaust mixed with the hot circulation of the series engine as it leaves the heater, the result will be that all the heat in that steam above the minimum temperature for the time being, which always in practice will be well below 100° centigrade, is surrendered in the hot circuit before its discharge therefrom liquefied, saving the heater of the series engine that amount. The thermal balance of the series engine in such case is not disturbed, and yet small separate engines working exactly as they do now are enabled by conditions external to them to work with practically one hundred per cent. efficiency of the heat in their steam, since every heat-unit in them which is not converted into work saves the series heater a corresponding amount. Even the comparatively low temperature of the exhaust-steam is not a theoretical loss. It is a practical convenience to have this low-temperature heat to mix with the high-temperature heat in the gases of combustion from the heater, in order that the two together may not exceed the required temperature when they enter the hot circulation; and as we do not avail ourselves of the interval between temperatures of combustion and working maximum temperature T of the series no theoretical loss results. The separate engines are assumed to have separate boilers and fire-boxes as the more extreme case. When they simply borrow a part of the circulating fluid or steam from some series boiler they become thermally a part of the series, though dissociated mechanically, and it is still easier to make them work with the full economy of the main engine. This element of the complete process has the great practical advantage for marine use, that by it all, or nearly all, the numerous small engines required about ship may be worked with high economy while left mechanically just as they are now or even with still less attention to their separate economy; but in addition it is likely to be desirable to have at least one non-condensing engine in series in order to secure the other advantages stated above under that head.

A general principle limiting the application of such dissociated engines may here be stated without detailing reasons, which would occupy much space for a comparatively unimportant point. Heat from an outside source cannot be thrust into the hot side only of the circulation with much resulting economy. We may not always loose, but we often shall, and in no case can we gain by so doing more than a small percentage, the limit being about ten per cent. conversion of the heat supplied. The thermal balance of the circulating system must be preserved to realize fully the economies last stated—i.e., the external source of heat must be in effect interpolated into the circulation between the cold side and the hot side and affect both, becoming then in effect merely an annex to the heater.

A further general principle limiting the use of dissociated engines is that, while generally, as above stated, the material of the circulating fluid is functionally indifferent, any large percentage of a vapor which condenses in the circulation is undesirable in the series. This results from the fact that from the very nature of the process the circulation should change in temperature as it receives or surrenders heat, and the theory of the process assumes it will. If it did not the engines in series could not work between successively-decreasing temperature. It is possible for them to do so to a sufficient extent, even though considerable vapor be condensed in the circulation, but any large amount is to be avoided. To this general rule, however, there is one important exception. If we make the circulating fluid a mere mechanical mixture of substances boiling at different temperatures, selecting these substances in such manner that each may tend to condense in some one boiler, the least volatile at the hot end and the most volatile at the cold end, then entirely different conditions, which in some respects are highly advantageous, will prevail. In the first place we no longer need an expansion tank, since a large part of our circulation is in the gaseous state; secondly, we gain that abnormal intensity of heat-transfer which exists only when a liquid is changing into vapor or vice versa; thirdly, a vapor circulates so much more rapidly than steam and carries so much more heat per pound that no larger passages are essential, while the circulation will for the most part propel itself. Crude petroleum stripped of its most volatile and least volatile constituents furnishes a natural circulating fluid of this nature, as it does a series of working substances, and, in general, any series of suitable working substances will by merely mixing them together and introducing the mixture into the circulating passages furnish a good circulating fluid, also, provided only that their physical properties as liquids are such that they readily mix, nor is even that absolutely essential.

Certain regulative features which are important will now be described.

If the circulating fluid be wholly or partially a liquid, an expansion tank or its equivalent must be used, and it is then theoretically possible, by providing circulating passages of immense strength and by substituting great vigilance for automatic regulation, to use the process with an unregulated fire and realize some of the advantages of the process; but to obtain the best results, whether the circulating fluid be a liquid or a gas, or partly both, it should include the regulation of the maximum and minimum temperatures of the circulating fluid in the hot circuit—that is, the regulation of the temperature of the circulating fluid as it enters the first pressure-generator of the series and as it passes from the last pressure-generator. On the cold side no regulation is necessary, because the very function of the circulating fluid on the cold side is to absorb all the heat delivered to it, which latter is always a certain function of the heat delivered from the hot side.

The regulation of the maximum temperature of the circulating fluid is very important when the fluid is heated by the direct action of fire. When a circulating fluid is drawn from a supply already regulated in temperature or the methods of heating be such as to assure the desired temperature of the circulating fluid, of course this feature may be omitted. There are three general methods possible for this regulation, which are independent of each other and may be effected by different means—that is, the regulation of the air-supply, the regulation of the fuel-supply, and waste of heat after combustion.

The air-supply may be regulated automatically with great exactitude by making the heater as nearly air-tight as may be and providing two openings for air-supply, respectively below and above the grate. Both openings may be controlled by any simple valve, preferably plain flap-valves, which should close the lower opening completely when the temperature or pressure of the circulation reaches a desired working maximum and which should open the upper opening pretty widely before heat begins to be wasted, as it has the double effect of checking the production of heat as well as wasting heat, and thus is more economical. The air-supply from the cold circuit is directed automatically or otherwise to the one or the other of these openings, according to the state of the fire.

The regulation of the fuel-supply may be very easily effected by a valve if any form of liquid, gaseous, or pulverized solid fuel be used, and such fuel is preferred. If the fuel be lump-coal in any form, such direct regulation is not possible; but in practical effect it may be closely approached by the use of a grate-shaker automatically adjustable, so that the grate motion ceases or is diminished whenever the circulating temperatures begin to rise above the desired maximum.

There are four obvious efficient ways of securing the wasting of the heat after combustion, all of which may be used, and which are preferably brought into action in the following order: Opening a direct escape for the gases of combustion, so that their heat is wasted, passing the circulating fluid through a wasteful cooler after it leaves the heater, a temperature safety-valve for the circulating fluid positively opened, a pressure safety-valve for the circulating fluid opened by excess of pressure. As all these methods are wasteful, they should not be the primary reliance for heat regulation; but the regulative methods previously described, which are a check upon the actual generation of heat, are preferably used in all cases, whether with or without any or all of these wasteful methods.

It is obvious that many different means may be used for securing regulation of the maximum temperature by some or all of the methods above pointed out, and that either thermostatic or pressure regulation may be used. I prefer the former; but whichever is used, we may by a single thermostat or regulator control all the regulative features desired, if a plurality be used, so as to act at successive small increments of temperature or pressure.

The best method of regulating the minimum temperature of the circulating fluid is by a thermostat located at the cold end of the hot circuit, and the best methods of applying a thermostat is to regulate with it the speed of circulation, so that if the circulating fluid is leaving the boilers too hot its speed may be checked, and if too cold its speed may be increased. The circulation may ordinarily be effected, on the well-known principle of hot-water heaters, by the difference in gravity of a hot and cold liquid, since the necessary speed of circulation is ordinarily quite slow, or it may be aided by a circulating-pump. When a circulating-pump is used, it will probably be found best to have the pump throw some excess over the maximum demand for circulation and provide a thermostatically-controlled by-pass cutting out the circuit through the heater or boiler; or a thermostatically-controlled valve on the circulation-pipe may be used, with or without a pump.

It is possible to regulate the minimum temperature in other ways than by regulating the speed of circulation—as, for instance, by making the withdrawal of steam perfectly uniform or by varying the area of the boiler-surface immersed in working substance—but regulation by varying the speed is simplest and best. It may be found desirable, also, to regulate the volume of the circulating fluid. When low temperatures only are used, it may be found sufficient to fill a small tight drum about half full and rely on occasional inspection to maintain the proper height of fluid within it. For higher temperatures this regulation of volume may be secured by using a very large expansion-tank or by providing means for regulating with some exactitude the level of the liquid within it, as by a storage-tank automatically controlled. The former is the simplest expedient, but the expansion-tank may be made much smaller and the volume of circulating fluid kept constant, regardless of temperature or oversight, which is highly desirable, by providing a separate storage-tank at some convenient point, preferably higher than the expansion-tank, and connecting it therewith in such manner that when the expansion-tank is more than about half full liquid flows from it to the storage-tank, and when it is less than half full liquid flows into it from the storage-tank. The storage-tank need not be higher than the expansion-tank if some slight and constant pressure be substituted for gravity.

It may be found desirable also to regulate the quantity of the working substances in the different pressure-generators, especially with large engines, as it may be found desirable to use a larger quantity of working substance than required to serve as a reserve against leakage and to automatically control the feed-pump, by which the condensed working substance is returned to the pressure-generator, so as to maintain the desired quantity of working substance in the latter, any overplus being retained in the condenser. It will be understood that any one of the many known devices may be used to effect this regulation, the proper one to select depending, primarily, upon how the feed-pump is driven, whether directly from the engine, by a separate engine, by electricity, or by the direct action of steam.

In some cases, also, it may be found desirable to regulate the degree of pressure that can exist in the different pressure-generators, although this will usually not be of importance, as the small thermal heads, which are desirable, will usually prevent any objectionable increase of pressure, when such thermal heads cease to exist, from stopping the withdrawal of steam from the boiler; but other provision may be occasionally needful, and it may best be secured by a mere liquid safety or blow-off valve through which, when the steam-pressure reaches a certain excess above the desired working pressures, all liquid is blown out of the pressure-generator and preferably back into the condenser.

So far we have considered engines in series only. We now come to certain desirable additions to the basic-series process effected by additional engines.

It will be understood that the cold interval necessary to give the working interval for the last engine may be secured by any suitable cooler, and the heat may either be wasted by such cooler or a cooler of such form as to utilize the heat may be used. Thus heat may be abstracted from the circulating fluid and the latter cooled by using the circulating fluid for any sort of external heating, either heating ships or buildings, for which the temperature of the circulating fluid, after leaving the last pressure-generator, will usually be well suited, or for any other purpose which involves the abstraction of heat, so as to utilize the heat that might otherwise be wasted to secure the necessary cold interval.

An important economy may be effected by utilizing the heat which must be rejected by the cooler in "cold-interval engines" added for this purpose, and such use forms an important addition to the process and apparatus. This result is attained by adding one or more cold-interval engines $t\ u\ v$, as shown in diagram in Fig. 7, which mechanically may and should appear as a part of the series, but functionally are outside of it, each having its own independent condenser $Ct\ Cu\ Cv$, from which the heat voided by it is rejected to waste and not returned to the circulation. Thus the rejection of heat required for the cold interval is in part effected by converting it into work externally and in part only by wasteful rejection.

The mechanical arrangement necessary to add these cold-interval engines is clear from the diagram, the hot circulation being carried through their boilers in the same manner as through the boilers of the series engines, the cooler at the end of the series being omitted and the cold circulation being carried through or past their condensers without permitting any rise of temperature therein above T', Fig. 2. This last may be effected, either by carrying the circulation past their condensers without entering them at all, as shown in Fig. 7, or by carrying the circulation through the cold-interval condensers in the same manner as in the series condensers, but with provisions for cooling it down again after passing through each cold-interval condenser by voiding the heat it has received in that condenser.

If the circulating fluid, in addition to being a heat-carrier, be a vapor or gas in a state of compression, so that it may itself act as a working substance and do work by expansion, as I make it in certain special applications of this process, this same work will or may cool the circulating fluid sufficiently, and it then becomes unnecessary to have any cold-interval boilers or any separate cooler or cooling process to accomplish their functional purpose. In the special applications referred to this becomes of much importance. The cooler and cold-interval engine or engines then become one. The circulating fluid may, if desired, be merely permitted to expand at the cold end in order to create the cold-interval. In that case the cooler becomes a mere pipe and release-valve and there is a waste of possible work precisely analogous to that from the omission of cold-interval engines; but if for the pipe and valve we substitute a working engine in which the circulating fluid expands and is thus cooled, useful work is done in this process of cooling, and thus this working cylinder in which the cooling is done becomes at once a cooler and a complete cold-interval engine, as stated.

Considering the properties of the process outlined in Figs. 7 and 8, the latter showing the temperature conditions when engines in series and cold-interval engines are worked together as one mechanism, as above described, we find that a series of whatever thermal length thus provided with cold-interval engines constitutes, theoretically, a reversible engine, according to the well-known generalization of Carnot—that is to say, if the mechanism be considered as a whole, it receives all its heat at the maximum temperature T, degrades none of this heat in temperature, except by the process of expansive work, and voids none of it until it has been thus reduced in temperature by expansion only to the lowest minimum for the time being T' at which a cold body can be found to void the heat into.

Carnot demonstrated that an engine working under these conditions did all the work that was possible for any expansion-heat engine to do between the given maximum and minimum temperatures, for the reason that if power were applied to the piston in the same measure that it was before taken from it heat would be supplied to the "hot body" in the same measure that it was before taken from it. In making this demonstration for the ideal case of a perfect-heat engine Carnot was obliged to assume, first, for his hot body infinite heat-supplying or heat-absorbing capacity at the maximum temperature T; second, for his cold body infinite heat-absorbing or heat-supplying capacity at the minimum temperature T'; third, infinite conductivity in the liquids or gases and in the transmitting-surfaces; fourth, absolute non-conductivity in the other surfaces in contact with the working substances. These assumptions we also are obliged to make for the theoretical case of reversibility; but the difference between the Carnot generalization and the complete process, as so far described, is that the Carnot generalization is widely different from practical conditions, even within the narrow range of 80° to 110° centigrade, to which alone it is applied in practice and beyond that range becomes a pure abstraction, whereas engines as actually constructed under the process herein described bear or may bear so close a relation to the theoretical case as to be nearly identical therewith not only within the narrow thermal ranges now customary, but also and in as great degree for the utmost extremes of range between the highest possible temperatures which the materials will stand and the lowest temperatures at which an engine can work and a cold body be found for voiding the rejected heat into.

Instead of passing the circulating fluid from the cold circuit directly to the heater, wherein change of temperature occurs without work, it is possible to increase the efficiency and economy of the process still further by the use of "hot-interval engines" working between a constant maximum temperature and an increasing minimum, which increases because of the gradual heating up of the cold circulation to fit it for the hot circuit. In other words, in place of heating up the circulation by the direct application of fire through the heater placed at the end of the series the otherwise rejected and lost heat of certain additional engines may be used to heat the circulation, all of the heat of the heater being preferably passed through these engines before being delivered to the circulating fluid.

Fig. 9, disregarding the engine $z$, to be described later, shows in diagram two such engines $x\,y$ added to the series and two cold-interval engines, the heater being shown as extended alongside of these engines. Considering the properties of the process indicated in Fig. 9, and in temperature diagram in Fig. 10, still disregarding the engine $z$—that is, the hot-interval engines in combination with the series engines and cold-interval engines— it may be seen that, as these hot-interval engines work absolutely with full efficiency, neither wasting or degrading any heat, except as it must be degraded to heat the circulation, they are highly economical, and by their addition we attain the paradoxical result of gaining from the engine theoretically, and practically also, barring a percentage of loss, a larger amount of work between the maximum and minimum temperatures than the Carnot limit of maximum efficiency makes possible for a single engine between two given temperatures. We can do this because we are, in effect, working two engines between the same temperatures instead of one, one of which engines has the function of heating up the hot body and the other of taking heat from it, and it is, of course, possible to get more work from a given supply of heat by passing it successively through two engines than through only one. Moreover, just as we have seen that the series and cold-interval engines are reversible, so the hot-interval engines $x\,y$ may also be shown to be reversible, considered as a separate engine, and hence the entire combination of series engines and cold and hot interval engines must be reversible, as it may readily be shown to be.

As a substitute or preferably as an addition to this method of extending the process at the hot end without increasing the maximum temperature T, it is possible, by further extending the process to include certain gas or other "heating engines" working between high temperatures exclusively, to obtain still more work, which is done exclusively above the maximum temperature T, and which in that case may be done with full efficiency of heat conversion in connection with the series, so that under favorable conditions it may be highly economical to do so. We may do this as follows: Between the temperature of combustion—say 1,650° centigrade—and probable value of T'—say 300° centigrade, more or less,—there is a wide thermal interval which so far has been bridged only by the gas engine. The entire interval seems unsuited to the working of steam-engines, because of the high temperatures. Because of the enormous thermal range through which they work, however, the conversion percentage of the best gas-engine is considerably higher than has yet been achieved or appears achievable with the steam-engine, though in proportion to its range it is far less efficient. In round numbers, about fifty per cent. of its heat is rejected in the cooling-jacket, about thirty per cent. in the exhaust-gases, and about twenty per cent. converted into work under favorable conditions.

As the thermal range of the gas-engine ends considerably above the temperature where that of the steam-engine begins, there is in theory nothing to prevent the use of its exhaust-heat to run any steam-engine; but in practice, owing to the way in which the waste heat of a gas-engine is discharged, and especially the way in which heat is now supplied to steam-engines, this theoretical possibility has had no practical value nor any promise of any. The circulatory system of the process herein described, however, makes it possible to overcome both of these difficulties to a large extent, at least, and thus to expand the process to cover a further economy. Fig. 9 illustrates clearly the method of doing so, and Fig. 10 shows the temperature conditions with a single heating-engine.

In Figs. 9 and 10 let $z$ be a gas-engine, which also serves as a heater for the series, the refuse heat from the gas-engine being used in place of a fire to heat up the circulating fluid. Let the series circulation be a double one, in part gaseous, in part liquid. Then the liquid circulation, which for economy's sake must be as large as possible relatively to the air, may be passed around the gas-engine jackets in place of water to absorb the portion of heat usually carried off through the jackets, which we have seen to be the larger part of the whole.

The gaseous circulation of the series will consist of both air and gas, which will be mixed in or before reaching the gas-engine and exploded therein, so as to give work and heat instead of being merely burned in a heater. The waste gases after expansion will then be turned into the hot-air circulation with or without some further surrender of heat to the liquid circulation before entering the circulation and discharged only after being cooled down in the series circulation to a low temperature, or the heat in the gaseous products of combustion may be all imparted to the liquid circulation, as nearly as may be, and the gases then discharged to waste.

These heating-engines, also, might be included under the general term "hot-interval engines;" but to distinguish between the two distinct kinds of such engines, the kind first described, working below T, are alone termed "hot-interval engines," and the ones working above T, which apparently must be gas-engines if used at all, are termed "heating-engines." Any type of engine which will work within the given thermal range may be used as a heating-engine instead of gas-engines, whether now known or yet to be invented; but the thermal peculiarities of the gas-engine process seem to fit it peculiarly well for this special use, with possible minor modifications, especially such as will permit a somewhat higher temperature in the jacket-circulation.

It may appear from the preceding description that although there may be gain in using either hot-interval engines or heating-engines separately, there can be no gain in using both on the same engine, nor would there be if the gas-engine were as capable as the steam-engine of gaining a proportionate increase of power from a slight increase of thermal range; but as a matter of fact the gas-engine is not capable of doing this. If we conceive a series, as shown in Figs. 9 and 10, provided with both hot-interval engines $x\ y$ and heating-engine $z$, the latter would do little if any more work if its range was extended down through the working range of $x\ y$. On the other hand, by cutting its range short at T and adding steam-engines below them, the latter will do a great deal of work within their comparatively narrow range, converting into work possibly ten per cent. of the heat which passes through them within a mean range of 33.3° centigrade, whereas the gas-engine will only do twice as much with forty times as great a range.

Summarizing the approximate limits of efficiency for the complete process as so far described, the heating-engines may convert twenty per cent. of the heat generated within them and reject eighty per cent. The hot-interval engines may possibly convert ten per cent. of this eighty per cent. into work, making twenty-eight per cent. of the heat-supply in all which is convertible into work before it reaches the "hot body" of the main series engines. A series of moderate length may convert into work half of its proper heat-supply, or thirty-six per cent. of the original supply, rejecting the other thirty-six per cent. into cold-interval engines. These latter may convert into work seven to eight per cent. of what reaches them, or say two and one-half per cent. of the original supply, leaving thirty-three and one-half per cent. of the heat only to be rejected at the minimum T', all the rest having been converted into work. These figures take no account of frictional or radiation losses, which are likely to be far less than in present practice, however, but otherwise should in the aggregate be easily attainable, and after more experience in working at high and low temperatures has been gained should be easily exceeded, barring the practical losses referred to. By extending the thermal range of the series engine as far as possible, no reason is perceived why the above may not be greatly exceeded in ordinary good practice and carried to seventy-five or eighty per cent.

The question of back-pressure as a separate issue does not arise in the theory or practice of the series or interval work. There is always back-pressure under the general theory of the engine, since it never seeks to condense to the zero of pressure; but the effect of any difference which may exist between the theoretical and actual back-pressure is already fully allowed for and included in the effect of the thermal head heretofore discussed.

The condensing conditions of the engine are quite different from those of ordinary practice, in which the aim always is to condense as nearly as possible to the zero of pressure. Under the general theory of this process the aim is always first to work with high-unit pressures in all the cylinders, in order to avoid unnecessary cylinder volume, and, second, to work through a moderate working interval only in order to avoid too great a cold-interval rejection in proportion to the total thermal range T T'.

A typical case may be to expand in each engine of a series from twelve down to five atmospheres, which for an engine using water as working substance means working between 188.5° and 152.3° centigrade or through a working interval of 36.2° centigrade. The hotter and colder engines should work between about the same pressures, though between different temperatures. Therefore there will be a constant pressure of about five atmospheres in all the condensers, and as the engine is exhausting from one end of the cylinder or the other nearly all the time a nearly constant inflow of steam at five atmospheres will keep the condensers at work at a nearly uniform rate maintaining that pressure. As the condenser is a mere duplicate of the boiler, yet has less heat to receive by the percentage of single-engine work, it should work with a slightly-less thermal head than the boiler and maintain the greater pressure due to that thermal head almost constantly. Therefore in determining the theoretical loss from that thermal head, as we have done, we determine also the full amount of all loss from back-pressure.

There is no direct thermal loss from clearance, however great, in the series or hot-interval engines, though there is a greatly reduced and ordinarily trivial indirect loss. In the cold-interval engines clearance causes the same percentage of loss as in any other engine, in both of which alike the loss results from the fact that the clearance steam only does a part of the work that it otherwise would, and is then discharged to waste.

In all of the engines in series, on the contrary, from the hottest to the coldest, as also in the hot-interval engines, the clearance-steam, like any other steam, is admitted at the maximum temperature for that engine, is cooled only by expansive work, and the heat left in it is transferred without further degradation of temperature to the general circulation, in which it can suffer further degradation only by being again transferred to some colder engine, where it again expands to do work, and so on down until the heat passes out of series at the temperature T', Fig. 2, &c., where clearance waste begins. Until then every condition of the Carnot generalization is complied with by the clearance steam as much as any other steam. Therefore there can be no direct loss; but indirectly there is a minor loss governed by complex laws which does not require explanation here. In this indirect way a clearance loss of ten per cent. in the individual engines results in a net loss of two to three per cent. in the series as a whole.

Neither my series engines nor my interval engines enjoy any direct advantage over existing types in respect to the heat which passes through the cylinders without doing work because of internal radiation, granting the wetness or superheating of the steam to be the same in each case. It is expected to secure a material advantage in this respect indirectly because of the difference in the boilers; but so far as the cylinders themselves are concerned, whatever percentage of heat radiates back into the exhaust is absolutely lost throughout the entire working range of the complete engine, as much so as in any other engine. There will be an apparent but not real economy in this respect under the process, just as there is an apparent but not real economy in this respect in compound as compared with simple engines of the same thermal range per cylinder. The more work is obtained from the useful quantity of heat the less will be the percentage of loss per horse-power from a constant percentage of heat loss. In this way compound engines appear to enjoy an advantage over simple engines of the same thermal range per cylinder. In a practical sense they do enjoy it, and my engines will enjoy a still greater advantage over the best existing compounds; but the percentage of absolute loss from the ideal case will be the same. Nevertheless, as an engine under this process may easily work up to fifty per cent. of heat-conversion apart from this loss, it is a comparatively small matter economically if even fifty per cent. more coal should be required because of this internal radiation loss; but it is still highly desirable to reduce this and all other losses to a minimum, and it is expected to eliminate this loss almost wholly by the smaller working interval and other improved conditions of the engine over those now in use.

All the elements of the complete process when used in the most efficient form now known to me and appropriate to this specification have now been explained. The features used may be varied widely and some of them may be omitted in selecting a process for any particular engine and locality, when simplicity of mechanism is deemed of more importance than high economy. Most of the features described, however, add so much to efficiency and so little to complexity that it will probably be found desirable to omit them but rarely even from the simplest engines. As, however, an efficiency of fifty per cent. is easily within the reach of simple applications of the process, which requires the combustion of only 0.36 pounds of coal per horse-power hour, leaving only 0.18 pounds of coal per horse-power hour to be saved by a perfect-heat engine, and as one-half of even this small remnant is saved by increasing the efficiency from fifty to sixty-seven per cent., it may be readily understood that a point is soon reached where it becomes uneconomical to seek further economy at the present prices of coal by sensibly increasing the bulk or complexity. The urgent need for better heat-engines arises only from the enormous wastefulness of present types, and most of the possible gain is secured by the first small advances beyond present limits—say, by doubling the present usual percentage of heat economy.

It will be understood by those skilled in the art to which the invention relates that the process above described in its various forms may be carried out by apparatus widely different in construction, arrangement, and mechanical details, and that the invention, considered broadly, is not to be limited to any particular form of apparatus or of the devices forming parts thereof. For the purpose of illustration I have shown in the accompanying drawings, forming a part of this specification, a simple apparatus for carrying out the process, employing a gas-heater and a single series of engines and condensers, this apparatus and the special devices being well suited for the purpose, and the general combinations thereof and certain specific features of the same forming part of the invention covered by this application.

Referring now to Fig. 11, which is largely diagrammatic, for clearness of illustration of the general arrangement, this drawing shows a series engine corresponding to the diagram, Fig. 1, and using a double or liquid and gas circulation, the gas being the fuel of the heater.

The working substances of the successive engines $a$ to $g$ are assumed to work in closed cycle between the boilers and condensers for the respective engines, being returned from condenser to boiler by the respective pumps $P^a$ to $P^g$. The engines $a$ to $g$ are shown in diagram only, and the pumps $P^a$ to $P^g$ likewise, as these and their connections may be of any suitable form.

The liquid circulating fluid passes through the condensers $C^a$ to $C^g$ and the cold circulation-pipe $V'$ to the heater H, where it is heated and passes thence through the hot circulating-pipe V and the expansion-tank E to and through the series of seven boilers $B^a$ to $B^g$, and then through circulation-meter M, circulating-pipe $V'$, circulating-pump P, and cooler C to the series of condensers, again to repeat the circuit. The liquid circulation is shown as passing successively through three concentric coils of pipe in the heater H, first upward, then downward, and upward again from the inner to the outer part of the heater, thus being exposed successively to hotter and hotter temperatures. The precise construction of the heater or arrangement of heating-surfaces is obviously a matter of indifference, and may be widely varied and will be changed according to the fuel used. As shown, the heater could be used either with coal or with gas. For using gas only the arrangement could be much simplified.

The air circulation, for simplicity of illustration, is assumed to be already mixed with the fuel-gas before entering the system, and enters from the external supply through the pipe $W'$ at the cold end, and thence passes in passage-ways through the tops of the successive condensers from the cold condenser $C^a$ to and through the hot condenser $C^g$, and thence through the pipe $W'$ to and through the heater. After combustion within the heater the air circulation is passed up, down, and up again by partitions 11, past the concentric coils of pipe V for the liquid circulation, and thence through the pipe W and passage-ways at the tops of the boilers, from the boiler $B^g$ to $B^a$. At the cold end of the hot circuit the gases will or may be so cooled down as to be passed through a suction-fan F, by which circulation is produced, and thence be discharged into the atmosphere without the aid of any chimney, which is more economical of heat than to use a natural chimney-draft, although it will be understood that the latter may be used, if desired. In order to keep a correct engine-log, the gas supply, and preferably the air supply, also, should be metered. In the construction illustrated this is effected by a meter $M'$ on the pipe $W'$ before entering the system. It will be understood that this air circulation may be carried through the condensers and boilers in suitable passage-ways outside the shells, as before stated, and it may be found that the mechanical convenience of such construction may overbalance somewhat its functional inferiority on account of the small area of the external surface of the condensers and boilers, and the fact that the air circulation, being ordinarily the hottest, should be applied in the upper parts of the boilers for the best functional action, while if carried outside the condensers and boilers the whole surface of the latter is used.

The maximum temperature of the gas-circulation—that is, its temperature on entering the boiler-circuit—requires no special controlling devices with a gas-flame, as shown, as this can be regulated once for all in the design of the heater, gas-flames burning at a given rate giving always the same temperature. The maximum temperature of the liquid circulation—that is, its temperature on entering the boiler-circuit—is regulated in the construction shown by regulating the fuel supply by a thermostat controlled by the temperature of the circulating fluid between the heater and expansion-tank E. A simple thermostat is shown, consisting of a stout wooden rod $T^h$ parallel with and adjacent to the circulating-pipe V, this part of the pipe V being formed, preferably, of a brass or copper tube, which expands largely. A thermostat-lever N is pivoted upon the end of the rod $T^h$, its short arm being connected to the pipe V and its long arm connected by a rod 12 to a cock 13 on the air and fuel supply pipe W', so that this thermostat controls the cock and supply of fuel in accordance with the temperature of the liquid circulation, so as to secure the desired maxium temperature of the hot circuit and no more. It will be understood that this maximum or hot thermostat, when used with the hot interval or heating engines, or both, will preferably be placed between the heater and the first boiler in series.

The minimum temperature of the liquid circulation on the hot side—that is, the temperature on leaving the boilers and before entering the cooler, which temperature determines the amount of heat abstracted in the boilers—is shown as regulated by regulating the speed of circulation. The circulating-pump P, as shown, consists of a chamber or enlargement of the pipe V', in which runs a screw or other force-pump Q, which may be driven in any suitable manner, a belt and pulley being shown for this purpose.

Upon the pipe V', between the cooler and circulating-pump P, is placed the minimum or cold thermostat $T^{h\prime}$, this thermostat being shown as operating on the same principle as the maximum thermostat, and which may consist of a wooden rod, a pipe $T^{h\prime}$ being shown for a purpose presently to be described, on which rod or pipe the lever N' is pivoted, this lever being connected to the pipe V' at a short distance from the pivot and its outer end being connected by a link 14 to a sliding gridiron-valve s, controlling a by-pass 15, which extends from the front to the rear of the screw Q within the chamber or pipe P'. The required regulation of speed is thus secured without any regulating-valve on pipe V' or means for varying the speed of the screw Q. When the temperature falls, this valve s closes the by-pass, so as to increase the speed of circulation, and as the temperature rises the valve is opened, so as to allow a part of the circulating fluid to pass through the by-pass 15 from front to rear of the screw, and thus check the speed of circulation and decrease the amount of heat delivered by the liquid circulation to the boiler. This cold thermostat is set to give the desired working interval for the cold engine a above the minimum temperature for the time being. It will be understood that the minimum or cold thermostat, when used with the cold-interval engine previously described, is preferably placed between the boilers in series and the cold-interval-engine boilers.

The cooler C is shown as of the same construction as the condensers or boilers, but somewhat larger. All that distinguishes it from either is that a cooling fluid enters through the usual aperture for working substance, passes down through the interior space for working substance, where it absorbs heat, and thence passes out as if a working substance. From the nature of its functions either the direction of the currents or the allotment of passages may be reversed—that is, the circulating fluid may pass either down or up—the cooling fluid then passing in the reverse direction, the passages being interchanged. The cooling fluid is shown as entering at the top through the pipe S' and leaving at the bottom through the pipe S.

Usually the cooling fluid will be at a substantially constant temperature from day to day. The setting of the cold thermostat should then also be constant from day to day, and the part $Th'$ should be of wood or other substance, which does not expand with heat. It may at times happen, however, that the cooling fluid varies considerably in temperature from hour to hour, which will result in a varying cold interval or compel the constant resetting of the thermostat. This inconvenience is readily avoided, however, by substituting a metallic pipe for the wooden rod and passing the cooling fluid through this rod on its way to the cooler, and $Th'$ is shown as a part of the pipe S'. Thus the cold thermostat will maintain the constant cold interval to which it may have been set.

If we conceive the cooling fluid passing through the cooler C to be the circulating fluid at the hot end of another and colder series working below that shown in Fig. 11, the cooler C becomes a transmitter without any mechanical change. In Fig. 12 such a construction is shown in diagram, the hotter series B being that shown in Fig. 11 and the colder series A that supposed to be below it. In this case the air circulation is simply carried through the pipe W' from the colder to the hotter series and returns through the pipe W from the hotter to the colder series, as if they were merely one series, as, in fact, they are, the transmitter having no dynamical significance. The liquid circulation of the cold series A circulates in the pipe $V^2$ exactly the same as the liquid circulation of the hot series B, excepting that at the hot end, instead of passing through a fire heater it passes through the transmitter C Tr, which is at once the cooler of the hotter series B and the heater of the cold series A, C' being the cooler of the cold series. There may or may not be a series meter M and cold thermostat in connection with the transmitter, as shown. Preferably there should be, but it is not essential.

The general construction of the boilers in one of the preferred forms is shown by Figs. 13 to 15, inclusive; but the details, of course, may be varied almost indefinitely. In Fig. 13 the arrows 1 show the hot-air circulation, which theoretically is carried straight from boiler to boiler and at the top of each, because it is the hotter part of the circulation; but in practice this course for mechanical convenience may be deviated from, as shown by these arrows, and the hot-air circulation taken outside the boiler sheets to carry it from boiler to boiler either in a direct passage, as indicated by the dotted pipe and the upper semicircular arrows, or caused to circulate around and jacket the cylinders before returning to the boiler-circuit, if desired. The liquid circulation may be used in place of the air for jacketing and is the better of the two for this use, except that the air may be at a somewhat higher temperature.

The arrows 2 2 show the general course of the liquid circulation, which, as previously stated, is preferably entered at the top and worked downward by a zigzag path to an exit at the bottom. Three returns are shown, but more than three are ordinarily expedient, and any number from two to even twenty or more may in different cases be used. The zigzag downward course of the circulating fluid is adopted to increase its possible speed, which at best is slow. By using vertical instead of horizontal tubes, the functional necessity for using zigzag passages will disappear, but the possible speed of the circulating fluid will be injuriously curtailed, and horizontal zigzag passages or some equivalent are preferable.

The tubes are omitted in Fig. 13 for clearness, but, as shown in the section, Fig. 14, the space between the tube-sheets is filled with a solid mass of tubes 3 for the circulation, the black tubes 4 being steam-pipes, shown as perforated to receive the steam evenly. The tubes above the line 5 5 are for the hot-air circulation, and the tubes between the lines 5 5 and 7 7, 7 7 and 9 9, and 9 9 and the bottom of the boiler, in Fig. 14, are for the successive returns of the liquid circulation. The interstitial space between these tubes is one open chamber for steam and liquid. No particular water-line is either shown or intended. Liquid enough to furnish steam for one (or $n$) strokes is caused to enter through the feed-pipe 16 by the pump at each (or every $n$th) stroke, the steam passing out through the perforated pipes 4 and main steam-pipe 17.

The boiler steam-pipes 4 4 may all be in one row or have any other arrangement, or may be omitted entirely and the steam taken out from a single opening at the top, but it seems preferable that the steam-exits should be somewhat scattered along the hot-air pipes, in order to promote perfect superheating and even evaporative action.

In Fig. 13 the barrel of the boilers B B is shown as faced at each end by a solid partition 6 6, which should preferably be made non-conducting. The circulation-chambers, through which successive series of tubes 3 connect at the ends of the boilers, are formed by plates 5 7 9, air circulation entering the chamber above the top plates 5 and the liquid circulation entering the chamber below the plates 5 from the base of the boilers through circulation-pipe 18 from the base of the next boiler, and passing successively horizontally and downward through the pipes and lower chambers to the base of the boiler, where it passes to the next boiler through pipe 18. Both the gaseous and liquid circulation are shown as carried from boiler to boiler by exterior connections, the gaseous by the upper dotted passage 19 and the liquid by the lower circulation-pipe 18. Although shown in Fig. 13, for convenience, as placed centrally at the top and bottom of the boiler, both of these passages should, as a rule, lie at one side of the center, as shown correctly in Figs. 14 and 15, in order that the total space occupied by the circular boiler and its appurtenances may not exceed, or not much exceed, the dimensions of an exscribed square about its boiler circle. The boilers may then be stacked up one above the other indefinitely without sacrificing compactness, the proper manner of multiplying boiler-power being rather by an indefinite multiplication of small units than by specially designed large units. The application of this principle is subject to many practical limitations, but as a general scheme I contemplate producing all boilers from precisely the same size of boiler-shell. The size I now prefer is sixteen inches outside diameter.

The solid face-plates 6 6 are expedient for a number of reasons, but chiefly to make it easy either to cut out any defective boiler permanently or to remove it for renewal or repair and to replace it again, all without stopping the engine or more than one engine. To this end and other ends one or more by-pass pipes 20, forming continuations of the circulation-pipes 18, should be preferably carried along past every boiler of sufficient size to pass the circulation outside of that boiler. They should be connected with the circulation-pipes 18 by a valve or three-way cock 21, which for clearness is shown functionally only. With these valves in the position shown in full lines in Fig. 13, the by-passes 20 are inactive. By throwing the two valves 21 at opposite ends of any boiler up into a horizontal position, as indicated in dotted lines in Fig. 13, that boiler is cut out of the circulation and the circulating fluid flows past it in the by-pass 20. The by-passes may or may not be filled with inert circulating fluid, but to save annoyance from possible leakage of the valves they preferably should be so filled. A precisely similar by-pass and valves may be provided for the air circulation to connect the passages 19 at opposite ends of the boiler, which are also preferably connected from boiler to boiler by some cylinder-jacketing passage. It will probably be found unnecessary, however, to provide the boilers with permanent by-passes for the air circulation, as they will seldom be used, but temporary pipes may be inserted, when desired, to remove the boiler.

By cutting out both the air and liquid circulation any boiler may be rendered inert for examination or repair, and it may be removed without interfering with the other boilers. It will be obvious, however, that these by-passes are in the nature of a convenient adjunct for occasional use, and in no way necessary to the functional action of the boiler when in service. They may, therefore, be omitted.

It is to be remembered that except when water or other liquid is circulated under pressure to raise its boiling-point all the circulatory passages are under only the very slight pressure needed for circulation, and therefore the joints need not be very tight. Every joint about the boiler, including the tube-sheet joints, can be made perfectly well by brazing, if the boiler is of copper, or by equivalent process for other metals. The theory and construction shown and to be shown does not permit more than a few degrees excess over a fixed maximum temperature in any boiler, but, as a rule, for mechanical reasons all the boilers should be made to stand the highest temperatures. The joint between plates 7 and 6 and between 9 and 6 need not even be made perfectly water-tight; that between plates 5 and 6 should be so, but need not stand much pressure.

The condensers are throughout mere duplicates of the boilers, save only that the arrows showing the direction of the circulation should be reversed. In Figs. 13 to 15, regarded as condensers, the steam to be condensed then enters through the steam-pipes 17 and 4 and works its way downward through the circulation-pipes 3 to the bottom, before reaching which it is condensed. The high pressure of four to five atmospheres, at which the steam will ordinarily condense, insures its forcing its way promptly into every point where there is a partial vacuum—i. e., where the surfaces are not doing enough work—without the aid of any open spaces between the tubes. It is only in attempting to condense to the zero of pressure that trouble from imperfect distribution of the steam to the surfaces arises. Then it naturally arises, as the total absolute pressure of the attenuated steam is but little more than a change of 1° centigrade will produce in steam of five atmospheres pressure. In the condensers as well as in the boilers it will be seen that the hottest temperatures are at the top and the coldest at the bottom. The air circulation will generally be hotter than the liquid when it enters the cold circuit, and as it is exposed to the first impact of the entering steam it is pretty sure to become so if it is not at first.

In Fig. 16 is shown in diagram an arrangement of the condensers or cold-circuit emergency increase of power by an interjected circulation, as already explained, this being provided for by connecting the condensers by pipes 22 for the circulation 2 passing outside the condenser-shells and adding a series of by-pass pipes 23, arranged in the same way as by-passes 20, and provided with valves similar to valves 21. Some or all of the condensers are provided, also, with other pipes 24, similar to pipes 22, and connecting the condensing-passages, and with by-passes 25 connecting said pipes, these by-passes being controlled by valves similar to valve 21. These pipes and by-passes are for a cold-water circulation $2^a$. (Shown in dotted lines.)

If an emergency arises for more power, the regular circulation of one or more of the condensers $C^c$ and $C^d$, as shown, is cut out into their by-passes 23 and the cold-water circulation cut into these condensers from by-passes 25 through pipes 24. These condensers may be first drained of their circulating fluid, or this will be driven out by the water circulation and voided externally, if not previously drained. If it is desired to provide only for a moderate increase of power, a few condensers only may be thus fitted up, but Fig. 16 shows all the condensers thus fitted. There is no serious objection to providing for the use of this power to the full extent in marine or other engines having use for it.

Ordinarily it is not expected that the condensing pressures will be more than half the boiler pressures, if so much. In this case doubling the power is the utmost to be gained by this interjected circulation unless the engines are especially designed for a greater excess. There is no reason, however, why the engines should not be designed to give three or four times their usual power in emergencies, nor is any sacrifice of the usual working economy involved in so doing, barring thermodynamic fractions.

The injection water required for the coolers, cold-interval condensers, and for this interjected circulation is used under quite different conditions from those of the ordinary condensing-engine—that is, in a steady stream through passages of approximately uniform cross-section without any pockets in them for air to collect in, and so without any necessity for an air-pump. It will probably be found preferable, therefore, at least in all marine and pumping engines, to obtain and circulate the supply of this liquid by devices acting on the well-known jerk-water principle, and many different arrangements may be used for this purpose. A simple and efficient construction is shown in Fig. 17, in which 26 represents the hull of a vessel, preferably near the bottom, where the water is colder, and well forward, where the water will be less disturbed by skin friction. The passage S' is continued to form the jerk-water passage, and terminates in a scoop 27. (Shown in position for use and out of use in full and dotted lines, respectively.)

When the ship is in motion, the water impinging upon it in the direction shown by the arrow tends to open the scoop 27 farther, a tendency which is resisted by the rod 28, ending in any form of stop 29. If any rupture of the passage S' occurs, it is only necessary to stop the headway and to have the check-rod so constructed as to resist tension only, when the scoop 27 will close of itself and thus stop the inflow. The construction shown, therefore, is better than the ordinary injection-pipe, which if ruptured can only be closed by a valve, and sometimes not at all. By adding at the voiding end of the passage S' what we may call a "suction" jerk-water, constructed exactly the same as in Fig. 17, except that it points in the reverse direction, and that the rod 28 is adapted to resist compression rather than tension, the velocity of the water in S' may be greatly increased to something like the velocity of the vessel. Such high velocity can hardly be required, but we thereby gain the further advantage that the pipes may be of uniform cross-section, since the velocity is uniform, regardless of lift, while in the construction shown the pipes must enlarge regularly upward, so that their cross-section may be in inverse ratio to the decrease in the velocity of the water due to the lift.

The same method of securing and circulating the supply may be used wherever there is a moving stream of water in a pipe, with or without the further aid of a pump, by borrowing water from a main and returning it again uninjured, except that some heat has been added to it. By this method of supply the loss of power involved in alternately stopping and starting the cold-water supply at high velocities, as is done twice by the ordinary air-pump, is avoided.

In pumping hot liquids, as must be done through quite an unusual range of temperatures between the boilers and condensers, the proper precautions must be taken to avoid trouble from lack of good suction. For this reason, instead of any form of mechanical pump, I prefer to use the pressure of steam directly somewhat on the pulsometer principle to effect the return of working substance to the boiler. Cylinder lubrication is likely to be a cause of some trouble unless properly managed, especially when working substance is worked in closed cycle. So far as possible this trouble should be avoided by using working substances which are in themselves lubricants. If lubricant be used, graphite mixed with a little of the working substance furnishes a suitable one. The valve-gear may be of any simple type, since the usual economic motives for using the Corliss and other more complex valve-gears are absent. Safety-valves of the ordinary type, arranged to open and close frequently and discharge large quantities of steam, are not needed, as the working pressure is very nearly the maximum which can arise, except in case of some accident. In lieu thereof there may be provided some form of simple relief-valve, spring-loaded, and set to discharge into the air circulation, and to make enough noise to attract attention when doing so. If, as is preferable, the temperature is strictly controlled throughout, these are little likely to come into action. Leaks of working substance into the circulating-passages are not likely to be detected at once unless by the noise or a fall of pressure. The only effect of such a leak is gradually to drain the boiler of working substance, and hence to destroy its efficiency. The engine will continue moving, but be dead.

The readings of the liquid meter in connection with the thermometer readings of the highest and lowest cold and hot temperatures of circulation give an absolute measure of the quantity of heat supplied to the engine during any given period. If there be an air circulation, also, and the air supply be metered, thermometer readings in the air circulation at the same points will give an absolute measure of the quantity of heat supplied to the engine through that circulation, except when non-condensing engines deriving heat from a source external to the heater are exhausting into the circulation, and in that case a practically exact measure of this extra heat can be obtained by metering the water supplied to such engines. By inserting thermometers in air and liquid circulation between each engine a similarly exact record of the work done by each engine, given directly in form of thermal units converted into work, will be obtained by simply multiplying the value of mass V, as shown by the meter readings, by the difference of thermometric or thermostatic readings. Thus any irregularities in the workings of the several engines may be at once detected and corrected—as, for example, a too volatile or unvolatile working substance for the best work with any engine.

The customary method of expressing efficiency in terms of the weight of steam used per hour is impossible with any type of engine under this process. The quantity of steam passed through each engine may of course be observed experimentally, but when found it has no significance, as we have seen, and it can be ascertained more easily and about as accurately by the thermometer and meter readings, given some knowledge of the quality of the steam in respect to superheating. For ascertaining this latter fact only, occasional quantitive observations of the vapor or liquid used per hour may be useful.

The general process for generating vapor pressure described herein based upon the dissociation of the fire from the pressure-generator and the use of a circulating fluid for heating the working substance and apparatus for carrying out the same, together with the process described herein of applying the heating or cooling agents to the working substances or exhaust in the pressure generators or condensers herein by the use of uniformly-distributed and closely-spaced passages, as defined, independently of the use of thin heat-transmitting walls, and constructions for carrying out this process are claimed in another application, Serial No. 499,531, Filed February 8, 1894, and are not claimed herein.

By the term "boiler," used in some of the claims, I mean and intend to cover an apparatus for the transfer of heat from one fluid to another, whether such transfer be made for the purpose of generating pressure or for condensing.

What is claimed is—

1. The thermodynamic process, which consists in passing a circulating fluid through a series of pressure generators and applying it to heating working substances in said pressure generators, applying said working substances in expansion engines, and applying the circulating fluid to condensing the working substances exhausted from some or all of the successive engines, substantially as described.

2. The thermodynamic process, which consists in heating a circulating fluid, passing the heated circulating fluid through a series of pressure generators and applying it to heating working substances in said pressure generators, applying said working substances in expansion engines, and applying the circulating fluid to condensing the working substances exhausted from some or all of the successive engines, substantially as described.

3. The thermodynamic process, which consists in passing a circulating fluid through a series of condensers and applying it to cooling working substance therein whereby the circulating fluid is somewhat heated, then further heating the circulating fluid, then passing the heated circulating fluid through a series of pressure generators and applying it to heating working substances therein, applying said heated working substances in expansion engines, a........usting said engines into said condensers, substantially as described.

4. The thermodynamic process, which consists in passing a circulating fluid through a series of pressure generators and applying it to heating working substances in said pressure generators, applying said working substances in expansion engines, applying the circulating fluid to condensing the working substances exhausted from some or all of the successive engines, and repeating the operation with the circulating fluid, heating the circulating fluid before entering the hot circuit and cooling it after leaving the hot circuit, substantially as described.

5. The thermodynamic process, which consists in passing a circulating fluid through a series of pressure generators and applying it to heating working substances in said pressure generators, applying said working substances in expansion engines, applying the circulating fluid to condensing the working substances exhausted from some or all of the successive engines, and returning the condensed working substances to their respective pressure generators, substantially as described.

6. The thermodynamic process, which consists in passing a circulating fluid through a series of pressure generators and applying it to heating working substances in said pressure generators, applying said working substances in expansion engines, applying the circulating fluid to condensing the working substances exhausted from some or all of the successive engines, returning the condensed working substances to their respective pressure generators, and repeating the operation with the circulating fluid and working substances, heating the circulating fluid before entering the hot circuit and cooling it after leaving the hot circuit, substantially as described.

7. The thermodynamic process, which consists in passing a circulating fluid partly liquid and partly gaseous through a series of pressure generators and applying it to heating working substances in said pressure generators, applying said working substances in expansion engines, and applying the circulating fluid to condensing the working substances exhausted from some or all of the successive engines, substantially as described.

8. The thermodynamic process, which consists in passing a circulating fluid partly liquid and partly gaseous through a series of pressure generators and applying it to heating working substances in said pressure generators, applying said working substances in expansion engines, applying the circulating fluid to condensing the working substances exhausted from some or all of the successive engines, and heating the circulating fluid before entering the hot circuit, substantially as described.

9. The thermodynamic process, which consists in passing a circulating fluid partly liquid and partly gaseous, through a series of pressure generators and applying it to heating working substances in said pressure generators, applying said working substances in expansion engines, applying the circulating fluid to condensing the working substances exhausted from some or all of the successive engines, and repeating the circuit with liquid portion of the circulating fluid, heating the circulating fluid before entering the hot circuit, and cooling the liquid portion of the circulating fluid after leaving the hot circuit, substantially as described.

10. The thermodynamic process, which consists in passing fuel through a series of condensers and applying it to cooling working substances therein, then burning the fuel in a heater, passing the gases of combustion through a series of pressure generators and applying them to heating working substances therein, applying said heated working substances in expansion engines, and exhausting said engines into said condensers, substantially as described.

11. The thermodynamic process, which consists in passing fuel through a series of condensers and applying it to cooling working substances therein in conjunction with a circulating fluid, then burning the fuel in a heater and thus heating the circulating fluid, passing the gases of combustion and circulating fluid through a series of pressure generators and applying them to heating working substances therein, applying said heated working substances in expansion engines, and exhausting said engines into said condensers, substantially as described.

12. The thermodynamic process, which consists in passing fuel through a series of condensers and applying it to cooling working substances therein in conjunction with a circulating fluid, then burning the fuel in a heater and thus heating the circulating fluid, passing the gases of combustion and circulating fluid through a series of pressure generators and applying them to heating working substances therein, applying said heated working substances in expansion engines, and exhausting said engines into said condensers, cooling the circulating fluid after leaving the hot circuit and repeating the operation with the circulating fluid in conjunction with another supply of fuel, substantially as described.

13. The thermodynamic process, which consists in passing a circulating fluid through a series of pressure generators and applying it to heating working substances in said pressure generators, applying said working substances in expansion engines, applying the circulating fluid to condensing the working substances exhausted from some or all of the successive engines, and using the circulating fluid thus heated in the cold circuit as hot circulating fluid for other series working at lower maximum temperatures, cooling the circulating fluid after leaving the hot circuit of the different series, substantially as described.

14. The thermodynamic process, which consists in passing a circulating fluid through a series of pressure generators and applying it to heating working substances in said pressure generators, applying said working substances in expansion engines, applying the circulating fluid to condensing the working substance exhausted from some or all of the successive engines, and using the circulating fluid thus heated in the cold circuit as hot circulating fluid for other series working at lower maximum temperatures, cooling the circulating fluid after leaving the hot circuit of the different series, and repeating the operation, heating the circulating fluid before re-entering the hot circuit of the first series, substantially as described.

15. The thermodynamic process, which consists in passing a circulating fluid through a series of pressure generators and applying it to heating working substances in said pressure generators, applying said working substances in expansion engines, applying the circulating fluid to condensing the working substances exhausted from some or all of the successive engines, passing the circulating fluid from the condensers through another series of pressure generators working at lower maximum temperatures than the first mentioned series and applying it to heating working substances therein, applying said working substances in expansion engines, applying said circulating fluid to condensing the working substances exhausted from some or all of said engines, and so on, if desired, for other series working at successively lower maximum temperatures, cooling the circulating fluid after leaving the hot circuit of each series, substantially as described.

16. The thermodynamic process, which consists in passing a circulating fluid through a series of pressure generators and applying it to heating working substances in said pressure generators, applying said working substances in expansion engines, applying the circulating fluid to condensing the working substances exhausted from some or all of the successive engines, passing the circulating fluid from the condensers through another series of pressure generators working at lower maximum temperatures than the first mentioned series and applying it to heating working substances therein, applying said working substances in expansion engines, applying said circulating fluid to condensing the working substances exhausted from some or all of said engines, and so on, if desired, for other series working at successively lower maximum temperatures, cooling the circulating fluid after leaving the hot circuit of each series, and repeating the operation with the circulating fluid, heating it before reentering the hot circuit of the first series, substantially as described.

17. The thermodynamic process which consists in passing a circulating fluid through a series of pressure generators and applying it to heating working substances in said pressure generators, applying said working substances in expansion engines, applying the circulating fluid to condensing the working substances exhausted from some of the successive engines and carrying it through or past one or more of the condensers for the working substances without applying it to condensing the working substance therein, substantially as described.

18. The thermodynamic process which consists in passing a circulating fluid through a series of pressure generators and applying it to heating working substances in said pressure generators, applying said working substances in expansion engines, applying the circulating fluid to condensing the working substances from some of the successive engines, and exhausting the other engines into the circulating fluid, substantially as described.

19. The thermodynamic process which consists in passing a circulating fluid through a series of pressure generators and applying it to heating working substances in said pressure generators, applying said working substances in expansion engines, applying the circulating fluid to condensing the working substances from some of the successive engines and exhausting the other engines into the circulating fluid, and repeating the operation, heating the circulating fluid before entering the hot circuit, substantially as described.

20. The thermodynamic process, which consists in passing a circulating fluid through a series of pressure generators and applying it to heating working substances in said pressure generators, applying said working substances in expansion engines, applying the circulating fluid to condensing the working substances from the successive engines, and exhausting into the circulating fluid certain expansion engines the working substances of which are not heated by the circulating fluid, substantially as described.

21. The thermodynamic process which consists in passing a circulating fluid through a series of pressure generators and applying it to heating working substances in said pressure generators, applying said working substances in expansion engines, applying the circulating fluid to condensing the working substances exhausted from some or all of the pressure generators, and cooling the circulating fluid after leaving the hot circuit by applying it to heating working substances for one or more engines, the exhaust from which is not condensed by the circulating fluid, substantially as described.

22. The thermodynamic process which consists in passing a circulating fluid through a series of pressure generators and applying it to heating working substances in said pressure generators, applying said working substances in expansion engines, applying the circulating fluid to condensing the working substance exhausted from some or all of the pressure generators, cooling the circulating fluid after leaving the hot circuit by applying it to heating working substances for one or more engines, the exhaust from which is not condensed by the circulating fluid, and repeating the operation with the circulating fluid, heating it before entering the hot circuit, substantially as described.

23. The thermodynamic process, which consists in passing a circulating fluid through one or more pressure generators and applying it to heating working substances therein, heating the circulating fluid after leaving each of said pressure generators, passing said heated circulating fluid through a series of pressure generators and applying it to heating working substances therein, applying said first and last mentioned working substances in expansion engines, and applying said circulating fluid to condensing the working substances exhausted from some or all of said engines, substantially as described.

24. The thermodynamic process, which consists in passing a circulating fluid through one or more pressure generators and applying it to heating working substances therein, heating the circulating fluid after leaving each of said pressure generators, passing said heated circulating fluid through a series of pressure generators and applying it to heating working substances therein, applying said first and last mentioned working substances in expansion engines, applying said circulating fluid to condensing the working substances exhausted from some or all of said engines, and repeating the operation with the circulating fluid, heating it before entering the first pressure generator and cooling it after leaving the hot circuit, substantially as described.

25. The thermodynamic process, which consists in passing a circulating fluid through a series of pressure generators and applying it to heating working substances in said pressure generators, applying said working substances in expansion engines, applying the circulating fluid to condensing the working substances exhausted from some or all of the successive engines, heating the circulating fluid before entering the hot circuit by the waste heat of gas or other engines working at a temperature above the maximum of the hot circuit, substantially as described.

26. The thermodynamic process, which consists in passing a circulating fluid through a series of pressure generators and applying it to heating working substances in said pressure generators, applying said working substances in expansion engines, applying the circulating fluid to condensing the working substances exhausted from some or all of the successive engines, heating the circulating fluid before entering the hot circuit by the waste heat of gas or other engines working at a temperature above the maximum of the hot circuit, and repeating the operation with the circulating fluid, cooling it after leaving the hot circuit, substantially as described.

27. The thermodynamic process, which consists in passing a circulating fluid through a series of pressure generators and applying it to heating working substances in said pressure generators, applying said working substances in expansion engines, applying the circulating fluid to condensing the working substance exhausted from some or all of the successive engines, heating the circulating fluid before entering the hot circuit by the waste heat of gas or other engines working at a temperature above the maximum of the hot circuit, and cooling the circulating fluid after leaving the hot circuit by applying it to heating working substance for one or more expansion engines, the exhaust from which is not condensed by the circulating fluid, substantially as described.

28. The thermodynamic process, which consists in passing a circulating fluid through a series of pressure generators and applying it to heating working substances in said pressure generators, applying said working substances in expansion engines, applying the circulating fluid to condensing the working substance exhausted from some or all of the successive engines, heating the circulating fluid before entering the hot circuit by the waste heat of gas or other engines working at a temperature above the maximum of the hot circuit, cooling the circulating fluid after leaving the hot circuit by applying it to heating working substance for one or more expansion engines, the exhaust from which is not condensed by the circulating fluid, and repeating the operation with the circulating fluid, substantially as described.

29. The thermodynamic process, which consists in passing a circulating fluid through one or more pressure generators and applying it to heating working substances therein, heating the circulating fluid after leaving each of said pressure generators, passing said heated circulating fluid through a series of pressure generators and applying it to heating working substances therein, applying said first and last mentioned working substance in expansion engines, applying said circulating fluid to condensing the working substances exhausted from some or all of said engines and heating the circulating fluid for the first mentioned pressure generators by the waste heat of gas or other engines working at a temperature above the maximum of hot circuit, substantially as described.

30. The thermodynamic process, which consists in passing a circulating fluid through one or more pressure generators and applying it to heating working substances therein, heating the circulating fluid after leaving each of said pressure generators, passing said heated circulating fluid through a series of pressure generators and applying it to heating working substances therein, applying said first and last mentioned working substances in expansion engines, applying said circulating fluid to condensing the working substances exhausted from some or all of said engines, and heating the circulating fluid for the first mentioned pressure generators by the waste heat of gas or other engines working at a temperature above the maximum of hot circuit, and repeating the operation with the circulating fluid, cooling it after leaving the hot circuit, substantially as described.

31. The thermodynamic process, which consists in passing a circulating fluid through one or more pressure generators and applying it to heating working substances therein, heating the circulating fluid after leaving each of said pressure generators, passing said heated circulating fluid through a series of pressure generators and applying it to heating working substances therein, applying said first and last mentioned working substances in expansion engines, applying said circulating fluid to condensing the working substances exhausted from some or all of said engines, heating the circulating fluid for the first mentioned pressure generators by the waste heat of gas or other engines working at a temperature above the maximum of hot circuit, and cooling the circulating fluid after leaving the hot circuit by applying it to heating working substance for one or more expansion engines the exhaust from which is not condensed by the circulating fluid, substantially as described.

32. The thermodynamic process, which consists in passing a circulating fluid through one or more pressure generators and applying it to heating working substances therein, heating the circulating fluid after leaving each of said pressure generators, passing said heated circulating fluid through a series of pressure generators and applying it to heating working substances therein, applying said first and last mentioned working substances in expansion engines, applying said circulating fluid to condensing the working substances exhausted from some or all of said engines, heating the circulating fluid for the first mentioned pressure generators by the waste heat of gas or other engines working at a temperature above the maximum of hot circuit, cooling the circulating fluid after leaving the hot circuit by applying it to heating working substance for one or more expansion engines the exhaust from which is not condensed by the circulating fluid, and repeating the operation with the circulating fluid, substantially as described.

33. The thermodynamic process which consists in passing a circulating fluid through a series of pressure generators and applying it to heating working substances in said pressure generators, applying said working substances in expansion engines, applying the circulating fluid to condensing the working substance exhausted from some or all of the successive engines, and regulating the maximum temperature of the circulating fluid, substantially as described.

34. The thermodynamic process which consists in passing a circulating fluid through a series of pressure generators and applying it to heating working substances in said pressure generators, applying said working substances in expansion engines, applying the circulating fluid to condensing the working substance exhausted from some or all of the successive engines, and regulating the minimum temperature of the circulating fluid in the hot circuit, substantially as described.

35. The thermodynamic process which consists in passing a circulating fluid through a series of pressure generators and applying it to heating working substances in said pressure generators, applying said working substances in expansion engines, applying the circulating fluid to condensing the working substance exhausted from some or all of the successive engines, regulating the maximum temperature of the circulating fluid, and the minimum temperature of the circulating fluid in the hot circuit, substantially as described.

36. The thermodynamic process, which consists in passing a circulating fluid at a regulated speed through a series of pressure generators and applying it to heating working substances in said pressure generators, applying said working substances in expansion engines, and applying the circulating fluid to condensing the working substances exhausted from some or all of the successive engines, substantially as described.

37. The thermodynamic process, which consists in passing a circulating fluid at a regulated speed through a series of pressure generators and applying it to heating working substances in said pressure generators, applying said working substances in expansion engines, applying the circulating fluid to condensing the working substance exhausted from some or all of the successive engines, and regulating the maximum temperature of the circulating fluid, substantially as described.

38. The thermodynamic process, which consists in passing a circulating fluid through a series of pressure generators and applying it to heating working substances in said pressure generators by passing it downward through the working substances, applying said working substances in expansion engines, and applying the circulating fluid to condensing the working substances exhausted from some or all of the successive engines, substantially as described.

39. The thermodynamic process, which consists in passing a circulating fluid through a series of pressure generators and applying it to heating working substances in said pressure generators by passing it downward through the working substances and preventing downward circulation of the working substances, applying said working substances in expansion engines, and applying the circulating fluid to condensing the working substances exhausted from some or all of the successive engines, substantially as described.

40. The thermodynamic process, which consists in passing a circulating fluid through a series of pressure generators and applying it to heating working substances in said pressure generators by passing it downward through the working substances in uniformly distributed and closely spaced passages, applying said working substances in expansion engines, and applying the circulating fluid to condensing the working substances exhausted from some or all of the successive engines, substantially as described.

41. The thermodynamic process, which consists in passing a circulating fluid through a series of pressure generators and applying it to heating working substances in said pressure generators by passing it downward through the working substances in uniformly distributed and closely spaced passages having thin heat transmitting walls, applying said working substances in expansion engines, and applying the circulating fluid to condensing the working substances exhausted from some or all of the successive engines, substantially as described.

42. The thermodynamic process, which consists in passing a circulating fluid through a series of pressure generators and applying it to heating working substances in said pressure generators by passing it downward through the working substances, in passages having thin heat transmitting walls, applying said working substances in expansion engines, and applying the circulating fluid to condensing the working substances exhausted from some or all of the successive engines, substantially as described.

43. The thermodynamic process, which consists in passing a circulating fluid at a regulated speed through a series of pressure generators and applying it to heating working substances in said pressure generators by passing it downward through the working substances, applying said working substances in expansion engines, and applying the circulating fluid to condensing the working substances exhausted from some or all of the successive engines, and regulating the maximum temperature of the circulating fluid, substantially as described.

44. The thermodynamic process which consists in passing a circulating fluid at a regulated speed through a series of pressure generators and applying it to heating working substances in said pressure generators by passing it downward through the working substances in uniformly distributed and closely spaced passages having thin heat transmitting walls, applying said working substances in expansion engines, applying the circulating fluid to condensing the working substances exhausted from some or all of the successive engines, and regulating the maximum temperature of the circulating fluid, substantially as described.

45. The thermodynamic process, which consists in passing a circulating fluid through a series of pressure generators and applying it to heating working substances in said pressure generators, applying said working substances in expansion engines, applying the circulating fluid to condensing the working substances exhausted from some or all of the successive engines, regulating the maximum temperature of the circulating fluid, and repeating the operation with the circulating fluid, heating the circulating fluid before entering the hot circuit and cooling it after leaving the hot circuit, substantially as described.

46. The thermodynamic process, which consists in passing a circulating fluid through a series of pressure generators and applying it to heating working substances in said pressure generators, applying said working substances in expansion engines, applying the circulating fluid to condensing the working substances, exhausted from some or all of the successive engines, regulating the minimum temperature of the circulating fluid, and repeating the operation with the circulating fluid, heating the circulating fluid before entering the hot circuit and cooling it after leaving the hot circuit, substantially as described.

47. The thermodynamic process, which consists in passing a circulating fluid through a series of pressure generators and applying it to heating working substances in said pressure generators, applying said working substances in expansion engines, applying the circulating fluid to condensing the working substances exhausted from some or all of the successive engines, regulating the maximum temperature of the circulating fluid and the minimum temperature of the circulating fluid in the hot circuit, and repeating the operation with the circulating fluid, heating the circulating fluid before entering the hot circuit, and cooling it after leaving the hot circuit, substantially as described.

48. The thermodynamic process, which consists in passing a circulating fluid at a regulated speed through a series of pressure generators and applying it to heating working substances in said pressure generators, applying said working substances in expansion engines, applying the circulating fluid to condensing the working substances exhausted from some or all of the successive engines, and repeating the operation with the circulating fluid, heating the circulating fluid before entering the hot circuit and cooling it after leaving the hot circuit, substantially as described.

49. The thermodynamic process, which consists in passing a circulating fluid at a regulated speed through a series of pressure generators and applying it to heating working substances in said pressure generators, applying said working substances in expansion engines, applying the circulating fluid to condensing the working substances exhausted from some or all of the successive engines, regulating the maximum temperature of the circulating fluid, and repeating the operation with the circulating fluid, heating the circulating fluid before entering the hot circuit and cooling it after leaving the hot circuit, substantially as described.

50. The thermodynamic process, which consists in passing a circulating fluid through a series of pressure generators and applying it to heating working substances in said pressure generators by passing it downward through the working substances, applying said working substances in expansion engines, applying the circulating fluid to condensing the working substances exhausted from some or all of the successive engines, and repeating the operation with the circulating fluid, heating the circulating fluid before entering the hot circuit and cooling it after leaving the hot circuit, substantially as described.

51. The thermodynamic process, which consists in passing a circulating fluid through a series of pressure generators and applying it to heating working substances in said pressure generators by passing it downward through the working substances and preventing downward circulation of the working substances in the pressure generators, applying said working substances in expansion engines, applying the circulating fluid to condensing the working substances exhausted from some or all of the successive engines, and repeating the operation with the circulating fluid, heating the circulating fluid before entering the hot circuit and cooling it after leaving the hot circuit, substantially as described.

52. The thermodynamic process, which consists in passing a circulating fluid through a series of pressure generators and applying it to heating working substances in said pressure generators by passing it downward through the working substances in uniformly distributed and closely spaced passages having thin heat transmitting walls, applying the circulating fluid to condensing the working substances exhausted from some or all of the successive engines, and repeating the operation with the circulating fluid, heating the circulating fluid before entering the hot circuit and cooling it after leaving the hot circuit, substantially as described.

53. The method of increasing the efficiency of engine systems employing boilers dissociated from the heater, which consists in applying the fuel in condensing the working substance, then burning the heated fuel in the heater, and applying the gases of combustion in heating the working substance, substantially as described.

54. The method of increasing the efficiency of engine systems employing a circulating fluid for heating and condensing the working substance, which consists in applying the fuel as part of the circulating fluid in condensing the working substance and then burning the heated fuel in the heater for heating the circulating fluid, substantially as described.

55. The method of increasing the efficiency of engine systems employing a circulating fluid for heating and condensing the working substance, which consists in applying the fuel as part of the circulating fluid in condensing the working substance and then burning the heated fuel in the heater for heating the circulating fluid, and then applying the gases of combustion as a part of the circulating fluid in heating the working substance, substantially as described.

56. The method of increasing the efficiency in systems employing a circulating fluid for heating and condensing the working substance for a series of engines, which consists in cutting out the circulating fluid from one or more of the condensers and substituting another condensing material, substantially as described.

57. The method of increasing the efficiency of systems employing a circulating fluid for heating and condensing the working substances for a series of engines, which consists in heating the circulating fluid in part by condensing the working substance of one or more engines working at or above the maximum temperature of the series, substantially as described.

58. The method of utilizing the thermal interval between the temperature of combustion and maximum temperature of the circulating fluid, in thermodynamic systems employing a circulating fluid for heating the working substance, which consists in heating the circulating fluid by the waste heat from gas or other engines working in said interval, substantially as described.

59. The thermodynamic process, which consists in passing a circulating fluid through a series of pressure generators and applying it to heating working substances in said pressure generators, then applying said circulating fluid to heating another circulating fluid and applying the second circulating fluid in a series of pressure generators working at a lower maximum temperature than the first mentioned series, applying the working substances in expansion engines, and applying the circulating fluids to condensing the working substances exhausted from some or all of their respective series of engines, substantially as described.

60. The combination with a series of expansion engines, and pressure generators and condensers therefor, provided with passages for applying a circulating fluid to heating and condensing the working substances, of connections between said passages through the series of pressure generators and some or all of the condensers for the circulating fluid, substantially as described.

61. The combination with a series of expansion engines, and pressure generators and condensers therefor, provided with passages for applying a circulating fluid to heating and condensing the working substances, of a heater, and connections between said passages through the series of pressure generators and some or all of the condensers and through the heater for the circulating fluid, substantially as described.

62. The combination with a series of expansion engines, and pressure generators and condensers therefor, provided with passages for applying a circulating fluid to heating and condensing the working substances, of a cooler, and connections between said passages through the series of pressure generators, the cooler and some or all of the condensers for the circulating fluid, substantially as described.

63. The combination with a series of expansion engines, and pressure generators and condensers therefor, provided with passages for applying a circulating fluid to heating and condensing the working substances, of a heater, a cooler, and connections between said passages through the series of pressure generators, the cooler, some or all of the condensers and the heater, for the circulating fluid, substantially as described.

64. The combination with a series of expansion engines, and pressure generators and condensers therefor, working in closed cycle and provided with passages for applying a circulating fluid to heating and condensing the working substances, of connections between said passages through the series of pressure generators and some or all of the condensers, for the circulating fluid, substantially as described.

65. The combination with a series of expansion engines, and pressure generators and condensers therefor, working in closed cycle and provided with passages for applying a circulating fluid to heating and condensing the working substances, of a heater, a cooler, and connections between said passages through the series of pressure generators, the cooler, some or all of the condensers and the heater, for the circulating fluid, substantially as described.

66. The combination with a series of expansion engines, and pressure generators and condensers therefor, provided with separate passages for applying liquid and gaseous elements of a circulating fluid to heating and condensing the working substances, of connections for the circulating fluid between said passages through the series of pressure generators and some or all of the condensers, substantially as described.

67. The combination with a series of expansion engines, and pressure generators and condensers therefor, provided with separate passages for applying liquid and gaseous elements of a circulating fluid to heating and condensing the working substances, of a heater, and connections for the circulating fluid between said passages through the series of pressure generators and some or all of the condensers and through the heater, substantially as described.

68. The combination with a series of expansion engines, and pressure generators and condensers therefor, provided with separate passages for applying liquid and gaseous elements of a circulating fluid to heating and condensing the working substances, of a heater, a cooler, connections for the liquid element of the circulating fluid between said passages through the series of pressure generators, the cooler, some or all of the condensers and the heater, and connections for the gaseous element through some or all of the condensers, the heater, and the series of pressure generators, substantially as described.

69. The combination with a series of expansion engines, and pressure generators and condensers therefor, provided with passages for applying the gases of combustion to heating the working substances and the fuel to condensing the working substances, of a heater in which the fuel is burned, and connections between the passages through the condensers to the heater for the fuel and from the heater through the series of pressure generators for the gases of combustion, substantially as described.

70. The combination with a series of expansion engines, and pressure generators and condensers therefor, provided with passages for applying fuel and a circulating fluid to condensing the working substances, and for applying the gases of combustion and circulating fluid to heating the working substances, of a heater for burning the fuel and thus heating the circulating fluid, and connections between the passages for the fuel and gases of combustion and between the passages for the circulating fluid, through the condensers, the heater, and the series of pressure generators, substantially as described.

71. The combination of a plurality of series of expansion engines, the successive series working at lower maximum temperatures, and pressure generators and condensers therefor, provided with passages for applying a circulating fluid to heating and condensing the working substances, coolers for the different series, connections for the circulating fluid in each series through the series of pressure generators, the cooler, and some or all of the condensers, and connections for the circulating fluid between the passages of each series and the next, substantially as described.

72. The combination of a plurality of series of expansion engines, the successive series working at lower maximum temperatures, and pressure generators and condensers therefor, provided with passages for applying a circulating fluid to heating and condensing the working substances, a heater, coolers for the different series, connections for the circulating fluid in each series through the series of pressure generators, the cooler and some or all of the condensers, and connections for the circulating fluid between the passages of each series and the next and from the cold circuit of the cold series through the heater to the hot circuit of the hot series, substantially as described.

73. The combination with a series of expansion engines, and pressure generators and condensers therefor, provided with passages for applying a circulating fluid to heating and condensing the working substances, of connections for the circulating fluid between said passages through the series of pressure generators and the condensers, and by-passes provided with valves for cutting the circulating fluid out of one or more of the pressure generators, substantially as described.

74. The combination with a series of expansion engines, and pressure generators and condensers therefor, provided with passages for applying a circulating fluid to heating and condensing the working substances, of connections for the circulating fluid through the series of pressure generators and the condensers, and by-passes for cutting the circulating fluid out of one or more of the condensers, substantially as described.

75. The combination with a series of expansion engines, and pressure generators and condensers therefor, provided with passages for applying a circulating fluid to heating and condensing the working substances, of connections for the circulating fluid through the series of pressure generators and the condensers, by-passes for cutting the circulating fluid out of one or more of the condensers, and means for introducing another condensing agent in place of the circulating fluid when cut out, substantially as described.

76. The combination with a series of expansion engines, and pressure generators and condensers therefor, provided with passages for applying a circulating fluid to heating and condensing the working substances, of one or more cold interval engines having pressure generators provided with passages for applying a circulating fluid to heating working substance, and connections for the circulating fluid between said passages through the series of pressure generators and pressure generators of the cold interval engines, and some or all of the condensers, substantially as described.

77. The combination with a series of expansion engines, and pressure generators and condensers therefor, provided with passages for applying a circulating fluid to heating and condensing the working substances, of one or more cold interval engines having pressure generators provided with passages for applying a circulating fluid to heating working substance, a heater, and connections for the circulating fluid between said passages through the series of pressure generators and pressure generators of the cold interval engines, some or all of the condensers, and the heater, substantially as described.

78. The combination with a series of expansion engines, and pressure generators and condensers therefor, provided with passages for applying a circulating fluid to heating and condensing the working substances, of a heater, one or more hot interval engines and condensers therefor, provided with passages for applying a circulating fluid to heating and condensing working substance, and connections for the circulating fluid between said passages through some or all of the condensers, the heater, the successive generators of the hot interval engines and return to heater from each pressure generator, and the series of pressure generators, substantially as described.

79. The combination with a series of expansion engines, and pressure generators and condensers therefor, provided with passages for applying the circulating fluid to heating and condensing the working substances, of a heater, one or more hot interval engines and condensers therefor, provided with passages for applying a circulating fluid to heating and condensing working substance, a cooler, and connections for the circulating fluid between said passages through the heater, the successive pressure generators of the hot interval engines and return to heater from each pressure generator, the series of pressure generators, the cooler, and some or all of the condensers, and return to heater, substantially as described.

80. The combination with a series of expansion engines and pressure generators and condensers therefor, provided with passages for applying a circulating fluid to heating and condensing the working substances, of one or more gas or other heating engines working above the maximum temperature of the hot circuit, passages for heating the circulating fluid by the waste heat of the heating engines, and connections for the circulating fluid between said passages of some or all of the condensers, the heating engines, and pressure generators, substantially as described.

81. The combination with a series of expansion engines and pressure generators and condensers therefor, provided with passages for applying a circulating fluid to heating and condensing the working substances, of one or more gas or other heating engines working above the maximum temperature of the hot circuit, passages for heating the circulating fluid by the waste heat of the heating engines, a cooler, and connections for the circulating fluid between said passages of some or all of the condensers, the heating engines, pressure generators, and cooler, substantially as described.

82. The combination with a series of expansion engines and pressure generators and condensers therefor, provided with passages for applying a circulating fluid to heating and condensing the working substances, of one or more gas or other heating engines working above the maximum temperature of the hot circuit, passages for heating the circulating fluid by the waste heat of the heating engines, one or more cold interval engines having pressure generators provided with passages for applying a circulating fluid to heating working substances, and connections for the circulating fluid between said passages of some or all of the condensers, the heating engines, pressure generators, and the pressure generators of the cold interval engines, substantially as described.

83. The combination with a series of expansion engines and pressure generators and condensers therefor, provided with passages for applying a circulating fluid to heating and condensing the working substances, of one or more gas or other heating engines working above the maximum temperature of the hot circuit, passages for heating the circulating fluid by the waste heat of the heating engines, a heater, one or more hot interval engines and condensers therefor, provided with passages for applying a circulating fluid to heating and condensing the working substances, one or more cold interval engines having pressure generators provided with passages for applying a circulating fluid to heating working substance, and connections for the circulating fluids between said passages of some or all of the condensers, the heating engines, the heater, the successive pressure generators of the hot interval engines and return to heater from each pressure generator, and the series of pressure generators and pressure generators of the cold interval engines, substantially as described.

84. The combination with a series of expansion engines and pressure generators and condensers therefor, provided with passages for applying a circulating fluid to heating and condensing the working substances, of one or more gas or other heating engines working above the maximum temperature of the hot circuit, passages for heating the circulating fluid by the waste heat of the heating engines, a heater, one or more hot interval engines and condensers therefor, provided with passages for applying a circulating fluid to heating and condensing the working substances, and connections for the circulating fluid between said passages of some or all of the condensers, the heating engines, the heater, the successive pressure generators of the hot interval engines and return to heater from each pressure generator, and the series of pressure generators, substantially as described.

85. The combination with a series of expansion engines, and pressure generators and condensers therefor, provided with passages for applying a circulating fluid to heating and condensing the working substances, of a heater, a cooler, connections for the circulating fluid between said passages through the series of pressure generators, the cooler, some or all of the condensers and the heater, and means for regulating the maximum temperature of the circulating fluid, substantially as described.

86. The combination with a series of expansion engines, and pressure generators and condensers therefor, provided with passages for applying a circulating fluid to heating and condensing the working substances, of a heater, a cooler, connections for the circulating fluid between said passages through the series of pressure generators, the cooler, some or all of the condensers and the heater, and means for regulating the minimum temperature of the circulating fluid in the hot circuit, substantially as described.

87. The combination with a series of expansion engines, and pressure generators and condensers therefor, provided with passages for applying a circulating fluid to heating and condensing the working substances, of a heater, a cooler, connections for the circulating fluid between said passages through the series of pressure generators, the cooler, some or all of the condensers and the heater, and means for regulating the maximum temperature of the circulating fluid and the minimum temperature of the circulating fluid in the hot circuit, substantially as described.

88. The combination with a series of expansion engines, and pressure generators and condensers therefor, provided with passages for applying a circulating fluid to heating and condensing the working substances, of a heater, a cooler, connections for the circulating fluid between said passages through the series of pressure generators, the cooler, some or all of the condensers and the heater, and means for regulating the maximum temperature and speed of the circulating fluid, substantially as described.

89. The combination with a series of expansion engines, and pressure generators and condensers therefor, provided with passages for applying a circulating fluid to heating and condensing the working substances, of a heater, a cooler, connections for the circulating fluid between said passages through the series of pressure generators, the cooler, some or all of the condensers and the heater, and means for regulating the speed of the circulating fluid, substantially as described.

90. The combination with a series of expansion engines, and pressure generators and condensers therefor, provided with passages for applying a circulating fluid to heating and condensing the working substances, the passages of the pressure generators extending downward through the working substance, of a heater, a cooler, and connections for the circulating fluid between said passages through the series of pressure generators, the cooler, some or all of the condensers and the heater, substantially as described.

91. The combination with a series of expansion engines, and pressure generators and condensers therefor provided with passages for applying a circulating fluid to heating and condensing the working substances, the passages of the pressure generators extending downward through the working substance and being uniformly distributed and closely spaced, of a heater, a cooler, and connections for the circulating fluid between said passages through the series of pressure generators, the cooler, some or all of the condensers, and the heater, substantially as described.

92. The combination with a series of expansion engines, and pressure generators and condensers therefor, provided with passages for applying a circulating fluid to heating and condensing the working substances, the passages of the pressure generators extending downward through the working substance and being uniformly distributed and closely spaced and having thin heat transmitting walls, of a heater, a cooler, and connections for the circulating fluid between said passages through the series of pressure generators, the cooler, some or all of the condensers and the heater, substantially as described.

93. The combination with a series of expansion engines and pressure generators and condensers therefor, provided with passages for applying a circulating fluid to heating and condensing the working substances, the passages of the pressure generators extending downward through the working substance and having thin heat transmitting walls, of a heater, a cooler, and connections for the circulating fluid between said passages through the series of pressure generators, the cooler, some or all of the condensers and the heater, substantially as described.

94. The combination with a series of expansion engines, and pressure generators and condensers therefor, provided with passages for applying a circulating fluid to heating and condensing the working substances, the passages of the pressure generators extending downward through the working substance, of a heater, a cooler, and connections for the circulating fluid between said passages through the series of pressure generators, the cooler, some or all of the condensers and the heater, and means for regulating the maximum temperature and speed of the circulating fluid, substantially as described.

95. The combination with two series of expansion engines working at different maximum temperatures, and pressure generators and condensers for said engines, provided with passages for applying a circulating fluid to heating and condensing the working substances, of connections in each series for circulating fluids between said passages through the series of pressure generators and some or all of the condensers, and a transmitter on said connections whereby the circulating fluid of the hot series in passing from the hot to the cold circuit heats and is cooled by the circulating fluid of the cold series in passing from the cold to the hot circuit, substantially as described.

96. The combination with a series of expansion engines and pressure generators and condensers therefor, provided with passages for applying the circulating fluid to heating and condensing the working substances, of a heater, connections between said passages through the series of pressure generators and some or all of the condensers, and through the heater, for the circulating fluid, and connections from the heater passing through the successive pressure generators and carrying gases of combustion, substantially as described.

97. The combination with a series of expansion engines and pressure generators and condensers therefor, provided with passages for applying the circulating fluid to heating and condensing the working substances, of a heater, connections between said passages through the series of pressure generators and some or all of the condensers, and through the heater, for the circulating fluid, and connections for carrying air to the heater through the successive condensers and carrying the gases of combustion from the heater through the successive pressure generators, substantially as described.

98. The combination with a heater and a series of pressure generators and condensers working at successively lower temperatures, of connections for carrying fuel to the heater through the successive condensers, and carrying gases of combustion from the heater through the successive pressure generators, substantially as described.

99. The combination with a series of pressure generators or condensers having passages for applying a circulating fluid to heating or condensing working substances, of connections between the passages of the different pressure generators or condensers and by-passes for cutting out one or more of said pressure generators, or condensers, substantially as described.

100. The combination with a series of condensers having passages for applying a circulating fluid to heating working substance, of connections between the passages of the different condensers, by-passes for cutting out the circulating fluid from one or more of said condensers, and connections for supplying another cooling medium to said condensers, substantially as described.

101. A boiler having small passages for a heating agent, provided with thin heat transmitting walls, substantially as described.

102. A boiler having small passages for a heating agent extending downward through the fluid to be heated and provided with thin heat transmitting walls, substantially as described.

103. A boiler having uniformly distributed and closely spaced passages for a heating agent extending downward through the fluid to be heated and provided with thin heat transmitting walls, substantially as described.

104. A boiler having small uniformly distributed and closely spaced passages for a heating agent extending downward through the fluid to be heated and provided with thin heat transmitting walls, substantially as described.

105. A series of boilers working at successively lower temperatures and having small passages for the heating agent provided with thin heat transmitting walls, substantially as described.

106. A series of boilers working at successively lower temperatures and having uniformly distributed and closely spaced passages for the heating agent extending downward through the fluid to be heated, and provided with thin heat transmitting walls, substantially as described.

In testimony whereof I have hereunto set my hand in the presence of two subscribing witnesses.

A. M. WELLINGTON.

Witnesses:
C. J. SAWYER,
T. F. KEHOE.